US006823174B1

(12) United States Patent
Masenten et al.

(10) Patent No.: US 6,823,174 B1
(45) Date of Patent: Nov. 23, 2004

(54) DIGITAL MODULAR ADAPTIVE ANTENNA AND METHOD

(75) Inventors: Wesley K. Masenten, Irvine, CA (US); Robert A. Dell-Imagine, Orange, CA (US)

(73) Assignee: Ditrans IP, Inc., Menlo Park, CA (US)

( * ) Notice: Subject to any disclaimer, the term of this patent is extended or adjusted under 35 U.S.C. 154(b) by 0 days.

(21) Appl. No.: 09/415,699

(22) Filed: Oct. 11, 1999

(51) Int. Cl.[7] ............................ H04B 1/00; H01Q 3/22

(52) U.S. Cl. ........................ 455/63.4; 455/25; 455/138; 455/273; 455/562.1; 342/368; 342/379

(58) Field of Search ............................ 455/562.1, 63.1, 455/63.4, 25, 137–139, 272.3, 276.1, 303; 342/16–18, 19, 379, 381, 384, 368–371, 372; 375/346, 347, 296, 297

(56) References Cited

U.S. PATENT DOCUMENTS

| | | | | |
|---|---|---|---|---|
| 4,720,712 A | | 1/1988 | Brookner et al. | |
| 5,422,889 A | | 6/1995 | Sevenhans et al. | |
| 5,557,642 A | | 9/1996 | Williams | |
| 5,600,326 A | | 2/1997 | Yu et al. | |
| 5,604,929 A | | 2/1997 | Loper et al. | |
| 5,621,752 A | | 4/1997 | Antonio et al. | |
| 5,854,612 A | | 12/1998 | Kamiya et al. | |
| 5,872,540 A | * | 2/1999 | Casabona et al. | 342/379 X |
| 5,926,135 A | | 7/1999 | Minkoff | |
| 5,952,965 A | | 9/1999 | Kowalski | |
| 6,714,584 B1 | * | 3/2004 | Ishii et al. | 375/148 |

FOREIGN PATENT DOCUMENTS

| | | |
|---|---|---|
| EP | 0 320 553 A1 | 6/1989 |
| JP | 10041733 | 2/1998 |
| WO | WO 00/33481 | 6/2000 |
| WO | PCT/US 00/41150 | 10/2000 |

OTHER PUBLICATIONS

Abidi, A.A. (1995) Direct–conversion radio transceivers for digital communications. IEEE Journal of Solid–State Circuits, vol. 30, No. 12:1399–1410.

Anvari, K., et al. (1991) Performance of a direct conversion receiver with π/4–DQPSK modulated signal. IEEE CH2944–7/91/0000/0822 822–827.

Candy, J.C., et al. (1992) Oversampling delta–sigma data converters. IEEE Press, New York 1–29.

Crochiere, R.E., et al. (1983) AT&T multirate digital signal processing. Prentice–Hall, Inc., Englewood Cliffs, N.J. 07632 143–183.

(List continued on next page.)

*Primary Examiner*—Nay Maung
*Assistant Examiner*—Philip J. Sobutka
(74) *Attorney, Agent, or Firm*—Knobbe, Martens, Olson & Bear, LLP

(57) ABSTRACT

An adaptive antenna is implemented using a plurality of modular array element modules. Each array element module comprises an antenna element of the adaptive antenna. Each antenna element is coupled to a weighting circuit is also coupled to a previous weighting circuit within a previous array element module in a concatenated manner. Each weighting circuit is configured to apply a complex weight to the antenna samples and add the result to the output of the previous weighting circuit. Each antenna element is also coupled to a cross-correlation measurement circuit configured to cross-correlate antenna samples with adaptation error samples to provide cross-correlation measurement samples to a controller which determines a weight applied by the weighting circuit.

14 Claims, 16 Drawing Sheets

OTHER PUBLICATIONS

Gabriel, W.F. (1992) Adaptive processing array systems. Proceedings of the IEEE, vol. 80, No. 1:152–162.

Jantzi, S.A., et al. (1997) Quadrature bandpass ΔΣ modulation for digital radio. IEEE Journal of Solid–State Circuits 32(12): 1935–1950.

Lopez, A.R. (1996) Performance predictions for cellular switched–beam intelligent antenna systems. IEEE Communications Magazine. 152–154.

Norsworthy, S.R., et al. (1997) Delta–sigma data converters theory, design and simulation. ISBN 0–7803–1045–4 1–74.

Proakis, J.G., et al. (1992) Advanced digital signal processing. Macmillian Publishing Co., New York 142–151.

Razavi, B. (1997) Design considerations for direct–conversion receivers. IEEE Transactions on Circuits and System–II: Analog and Digital Signal Processing 44(6):428–435.

Sethares. W.A., et al. (1988) Excitation conditions for signed regressor least mean squares adaptation. IEEE Transactions on Circuits and Systems. vol. 35, No. 6:613–624.

Shoval, A., et al. (1995) Comparison of DC offset effects in four LMS adaptive algorithms. IEEE Transactions on Circuits and System–II: Analog and Digital Signal Processing. vol. 42, No. 3:176–185.

Weaver, D.K., Jr. (1956) A third method of generation and detection of single–sideband signals. Proceedings of the IRE 44:1703–1705.

Widrow, B., et al. (1967) Adaptive antenna systems. (1967) Reprinted from Proceedings of the IEEE, vol. 55, No. 12:3–19(2143–2159).

* cited by examiner

DIGITAL MODULAR ADAPTIVE ANTENNA AND METHOD

BACKGROUND OF THE INVENTION

1. Field of the Invention

The present invention relates to wireless communications. More particularly, the present invention relates to adaptive antenna systems.

2. Description of the Related Art

With the advent and proliferation of digital communication systems, the need for high capacity, high performance systems continues to accelerate. These needs have prompted a strong interest in the development of efficient antenna systems for use at a base station. Efficient antenna systems can increase the capacity and performance of existing digital communications systems without modification of the standardized wireless link protocols.

FIG. 1 shows a typical base station 10 and its corresponding coverage area. The coverage area of the base station 10 corresponds to the geographical region over which the base station 10 is capable of servicing a remote unit. For example, within the coverage area of the base station 10, a series of remote units 12A–12N are shown. The base station 10 is sectored in that it provides three distinct coverage areas 14A, 14B and 14C in a manner typical of modem base stations. In general, a base station comprises three or more sectors dividing the coverage area into 120° or smaller sections to provide a 360° azimuth field. The use of sectors improves the overall performance and capacity of the base station.

Each sector 14A–14C has a separate antenna system. The use of separate systems decreases the interference between remote units located in different sector coverage areas. For example, the remote unit 12C is within the coverage area 14B and, therefore, provides very little interference to the remote unit 12N located within the coverage area 14C. In contrast, remote units 12A and 12B are each located within the coverage area 14A, therefore, their signals interfere with one another to some extent at the base station 10.

To reduce the interference created by remote units operating within a common coverage area, a variety of multiple access schemes have been developed. For example, code division multiple access (CDMA), time division multiple access (TDMA), frequency division multiple access (FDMA) or frequency hopping can be used to reduce the interference within a sector. In each of these types of systems, the use of multibeam antenna systems to further sectorize the base station coverage area further reduces co-channel interference and increases the capacity of the system.

For example, to further reduce the interference between remote units within a sector, an antenna array can be used to divide a typical 120° base station sector coverage area into smaller segments called “beams”. FIGS. 2A and 2B are graphs showing a typical narrow-beam coverage area pattern in polar and rectangular format, respectively. As shown in FIGS. 2A and 2B, in addition to a narrow main beam 20A, multiple sidelobes 20B–20E are also present. In general, the amplitude of the sidelobes 20B–20E are lower than the main lobe 20A. For example, in the embodiment illustrated in FIGS. 2A 2B, each sidelobe 20B–20E is at least 30 decibels (dB) down from the main lobe 20A.

FIGS. 3A and 3B show a top view and a side view of an antenna array capable of producing the coverage area pattern shown in FIGS. 2A and 2B. Each of the three antenna arrays 24A–24C is made up of eight array elements 26A–26H. Together the three antenna arrays 24A–24C provide a full 360° coverage area. In FIG. 3B, the eight array elements 26A–26H have a nominal one-half wavelength spacing. FIG. 3C is a block diagram showing additional circuitry coupled to the antenna array 24A which make up a beamformer capable of producing the coverage area pattern shown in FIGS. 2A and 2B. The output of each array element 26A–26H is coupled to a weighting block 28A–28H, respectively. The weighting blocks 28A–28H provide amplitude tapering and phase shifting, thus, effectively multiplying the incoming signals by a complex set of weights, $\{\underline{W}_m, m=1 \ldots 8\}$. (Through out this text, complex functions and numbers are denoted by underscored text.) The outputs of the weighting blocks 28A–28H are summed in a summer 30. Weighting the output of each array element 26A–26H by the weighting blocks 28A–28H controls the gain at the peak of the beam, the width of the beam and the relative gain of the sidelobes.

Each array element 26A–26H within the antenna array 24A ideally has an identical pattern gain and shape over the field of view of the array. This pattern, called the element factor, typically varies as the function of the angle from the normal to the array face. In typical systems, the antenna array comprises 8 or 16 array elements (i.e., m=8 or m=16) and associated weighting blocks. The weighting blocks shown in FIG. 3C are sufficient to create one narrow beam such as shown in FIG. 2A. To create additional beams, additional weighting blocks and summers must be used.

Referring again to the example of FIG. 2A, if a remote unit 22A is located within the main lobe 20A and a remote unit 22B is located within the sidelobe 20, the base station receives the signal energy transmitted by both the remote unit 22A and 22B. Although the signal from the remote unit 22B is reduced by the gain of the sidelobe relative to the main beam, the signal from the remote unit 22B may still cause significant interference with the signal from the remote unit 22A.

In the prior art, adaptive antenna techniques have been used to change the coverage area pattern when the remote unit signal within a sidelobe is interfering with the signals in the main beam. These adaptive antenna techniques detect the presence of an interfering signal and modify the coverage area pattern generated by the antenna beamformer to further suppress the interfering signals in the sidelobes. For example, in the situation shown in FIG. 2A, it would be advantageous to decrease the size of or place a null in the sidelobe 20E so that the effects of signal from the remote unit 22B on the signal from remote unit 22A may be reduced. Prior art has proposed many of these “smart antenna array” designs to achieve this purpose, but in general, their complexity makes their implementation costly and limits their use in standard terrestrial wireless systems.

In the case shown in FIG. 2A, a null can be placed within the sidelobe 20E to decrease the effects of the signal from the remote unit 22B on the system. However, placement of a null within a sidelobe produces a corresponding increase in sidelobe-gain at some other location as illustrated in FIG. 2C. In FIG. 2C, nulls have been place at approximately −60,−40,20,38 and 60 degrees from boresight. Notice that the sidelobe having a peak at approximately 28 degrees from boresight has a maximum gain that is greater than −20 dB with respect to the gain of the main lobe. In fact, it is possible for the gain of a sidelobe to exceed the gain of the main lobe if certain weighting parameters are selected.

FIG. 4 is a block diagram showing an adaptive null steering system which is also known in the art as a coherent sidelobe cancellation antenna system. The system includes an antenna array 40 which operates in a similar manner to the system shown in FIG. 3C. For example, the antenna array 40 can be configured to produce a standard narrow beam such as the antenna pattern shown in FIG. 2B. The antenna pattern includes the sidelobes 20B–20C as shown. In addition, the antenna system in FIG. 4 comprises two auxiliary antennas 42A and 42B. The antennas 42A and 42B are coupled to complex weighting blocks 44A and 44B, respectively. The values $D_1$ and $D_2$ within the elements 44A and 44B, respectively, are complex weights which can be set to form an auxiliary antenna pattern. For example, an antenna pattern 82 in FIG. 5 represents an antenna pattern for the auxiliary antennas 42A and 42B. Note that the antenna pattern 82 forms a beam which encompasses the sidelobe area corresponding to the antenna pattern shown in FIG. 2B and has a null in the direction of the main beam. A broader null in the direction of the main beam can be developed with the use of additional auxiliary antennas such as such shown in FIG. 5 as an antenna pattern 84 which is created using four auxiliary elements.

The output of the complex weights 44A and 44B are coupled to a summer 46 which produces a combined output. The combined output is input into a complex weighting block 48 which applies complex weight β. The output of the complex weighting block 48 is coupled to a summer 50 which sums the output of the antenna array 40 with the output of the complex weighting block 48.

When a signal is received through a sidelobe of the antenna pattern, the same signal is also received through the auxiliary antennas 42A and 42B. However, the phase and amplitude of the signal received through the antenna array 40 and the auxiliary antennas 42A and 42B is different at the input to the summer 50. If the amplitude and phase is properly adjusted, the signal energy which has been received through the auxiliary array can be coherently subtracted from the signal energy received through the sidelobe of the main beam. In order to adjust the complex weight $\beta_1$, the output of the summer 50 is cross-correlated with the output of the summer 46 using coherent (phase sensitive) detection by a cross-correlator 52. If a signal is present both at the output of summer 50 and the summer 46, it is detected by the cross-correlator 52. By integrating the output of the cross-correlator 52, an error signal is generated which can be used to adjust the value of the complex weight A to reduce the energy received through the sidelobes at the output of the summer 50 according to well known techniques, such as Widrow's least mean squared (LMS) algorithm as described in B. Widrow, et. all, Adaptive Antenna Systems, Proceedings of the IEEE, Vol. 55, No. 12, December 1967, pp. 2143–2159. As a result, a null in the direction of the undesired signal is created in the combined pattern of the main and auxiliary antenna beams.

As noted above, as the adaptation algorithm adjusts the gain of the sidelobes to steer a null in the direction of one or more interfering signal, the gain of other sidelobes may increase. If the gain of these sidelobes is allowed to increase, two undesirable results can occur. First, the total interference level is increased by additional interference and noise received through the undesirably high sidelobes. Second, the probability that a new interfering signal source will appear within the undesirably high sidelobe and cause interference until the adaptation algorithm can react to squelch it also increases.

Therefore, there is the need in the art for a smart antenna array with high performance yet which is less complex and more modular than existing systems. In addition, there is a need in the art for a method of maintaining a acceptable sidelobe level while concurrently adapting to suppress high level interference within the sidelobe region.

SUMMARY OF THE INVENTION

An antenna beam is adapted to current operating conditions by determining a maximum gain value of a sidelobe region of the adaptive antenna pattern and, also, determining a corresponding angle at which the maximum gain value is achieved. Next, a min-max gradient of the adaptive antenna pattern at the corresponding angle is determined. A next value of a first partial weighting value is then determined according to a current value of the first weighting value, a first predetermined step size, a first predetermined decay constant and the min-max gradient. The first partial weighting value is used to determine the adaptive pattern of the antenna beam. The next value of the first partial weighting value is determined so that it tends to limit the maximum gain value within the sidelobe region. For example, the first partial weighting value can tend to maintain a relatively uniform gain within the sidelobe region.

In addition, a null-steering gradient of an adaptation error is determined based upon a set of cross-correlation measurement samples reflecting the current operating conditions. A next value of a second partial weighting value is determined according to a current value of the second partial weighting value, a second predetermined step size, a second predetermined decay constant and the null-steering gradient. The second partial weighting value is also used to determine the adaptive pattern of the antenna beam. The next value of the second partial weighting value is determined so that it tends to steer a null in the direction of an interfering signal received through the sidelobe region.

Based upon the next value of the first partial weighting value and the next value of the second partial weighting value, a beamforming weight is updated. The beam forming weight is used by an antenna array to create the antenna beam. In this way, the antenna beam is adapts to current operating conditions without adapting to a pattern with excessively high sidelobe regions.

The maximum gain value of the adaptive antenna pattern can be calculated open loop. For example, the adaptive antenna pattern can be determined according to:

$$\underline{E}_k(\theta_k, \Phi_k) = \sum_{m-1}^{M} \underline{W}_{k,m}(i) e^{j\left[m\left(\frac{2\pi}{\lambda}\right)\cdot d(\sin\theta_k - \sin\Phi_k)\right]}$$

wherein:

$E_k(\theta_k, \Phi_k)$ represents a gain value of the adaptive antenna pattern at an evaluation angle, $\theta_k$;

d is the distance between antenna elements of an antenna array producing the antenna beam in meters;

λ is the wave length of a receive signal in meters.

$\Phi_k$ is the center angle of a main beam of the adaptive antenna pattern with respect to boresight; and $\theta_k$ is the evaluation angle at which the gain value is evaluated.

The min-max gradient can be determined according to:

$$\underline{\Gamma}_m(i-1, \theta_{k-\mathrm{Max}}, \Phi_k) = |\underline{E}_k(\theta_{k-\mathrm{Max}}, \Phi_k)| e^{j\left[m\cdot\left(\frac{2\pi}{\lambda}\right)\cdot d(\sin\theta_{k-\mathrm{Max}} - \sin\Phi_k)\right]}$$

wherein:

$\Gamma_m(i-1, \theta_{k\text{-}Max})$ is the min-max gradient;

$\theta_{k\text{-}Max}$ is approximately the corresponding angle; and $E_k(\theta_{k\text{-}Max}, \Phi_k)$ is the maximum gain value of the adaptive antenna pattern at the corresponding angle, $\theta_{k\text{-}Max}$.

Using these values, the next value of the first partial weighting value can be determined according to:

$$A_{k,m}(i)=\rho_A \cdot A_{k,m}(i-1)-\upsilon_A \cdot \Gamma_{k,m}(i-1, \theta_{k\text{-}Max}, \Phi_k)/|\Gamma_{k,m}(i-1, \theta_{k\text{-}Max}, \Phi_k)|$$

wherein:

$A_{k,m}(i)$ is the next value of the first partial weighting factor;

$A_{k,m}(i-1)$ is the current value of the first partial weighting factor;

$\rho_A$ is the first predetermined decay constant; and $\upsilon_A$ is the first predetermined step size.

The null-steering gradient of the adaptation error can be determined by measuring a level of current energy received through the antenna beam and mathematically applying a transfer characteristic of a phantom auxiliary beam. For example, the null-steering gradient of the adaptation error can be determined according to:

$$\Lambda_{k,q}(i) = \sum_{m=q}^{P+q} D_{k,m} C_{k,m}(i)$$

wherein:

$\Lambda_{k,q}(i)$ is the null-steering gradient of the adaptation error for a $q^{th}$ phantom auxiliary beam for the antenna beam k;

$C_{k,m}(i)$ is a cross-correlation measurement sample set of signal energy received each array element, m, of an antenna array cross-correlated with energy in a compensated output of the antenna beam;

$D_{k,p}(i)$ is a complex weight which determines the contribution of a $p^{th}$ array element to the $q^{th}$ phantom auxiliary beam for the antenna beam;

Q is a total number of phantom auxiliary beams; and.

P is a total number of array elements used to create each phantom auxiliary beam.

The adaptation method just described can be used with a variety of antenna configurations. For example, one advantageous antenna configuration which can be used with the method is one in which a modular set of modules are concatenated together. Such an adaptive antenna system includes a plurality of array element modules, each array element module has an antenna element. The antenna element makes up one component of an antenna array. A programmable delay element has an input coupled to an output of the antenna element. The programmable delay element is configured to produce a delayed output.

Each array element module also has a weighting circuit. The weighting circuit has an antenna sample input coupled to the delayed output of the programmable delay element. The weighting circuit also has a composite signal input and a composite signal output. The weighting circuit is coupled to a previous weighting circuit within a previous array element module in a concatenated manner such that the composite signal output from the previous weighting circuit is coupled to the composite signal input of the weighting circuit. The weighting circuit is configured to apply a complex weight to samples received from the antenna sample input to produce weighted antenna samples. The weighting circuit is also configured add the weighted antenna samples to samples received from the composite signal input and to provide a resultant signal to the composite signal output.

The array element module also has a second delay element having an input coupled to the output of the antenna element and having a delayed output. Finally, the array element module has a cross-correlation measurement circuit. The cross-correlation measurement circuit has an antenna sample input coupled to the delayed output of the second delay element. The cross-correlation measurement circuit also has an adaptive error input and a cross-correlation measurement output. The cross-correlation measurement circuit is configured to cross-correlate samples received from the antenna sample input with samples received from the adaptive error input to provide cross-correlation measurement samples to the cross-correlation measurement output.

The plurality of array element modules are controlled by an adaptation controller. The adaptation controller has a controller input coupled to the cross-correlation measurement output of the cross-correlation measurement circuit within each of the plurality of array element modules. The adaptation controller also has a weighting output. The adaptation controller is configured to determine the complex weight to provide the weighting circuit within each of the plurality of array element modules. The adaptation controller determines the complex weights based upon the cross-correlation samples at the controller input.

In one embodiment, the cross-correlation measurement circuit further has a delayed adaptive error output configured to provide a delayed version of the samples received from the adaptive error input. The cross-correlation measurement circuit is coupled to a previous cross-correlation measurement circuit within the previous array element module in a concatenated manner such that the delayed adaptive error output from the previous cross-correlation measurement circuit is coupled to the adaptive error input of the cross-correlation measurement circuit. The composite signal output of a last weighting circuit within a last one of the plurality of array element modules can be coupled to the adaptive error input of a first cross-correlation measurement circuit within a first one of the plurality of array element module, such as via a channel filter.

In another embodiment, each of the plurality of array element modules comprises a plurality of the weighting circuits and a plurality of the cross-correlation measurement circuits, each pair of which corresponds to one of K antenna beams. In yet another embodiment, the adaptation controller is configured to determine the complex weight using a min-max adaptation algorithm which tends to limit a maximum gain value within a sidelobe region the antenna beam and a null steering adaptation algorithm which tends to steer a null in the direction of an interfering signal received through the sidelobe region.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE INVENTION

An adaptive antenna system according to one embodiment of the invention adaptively forms the radiation patterns for a multiple beam array that concurrently maintains a specified minimum gain for each main beam, maintains an approximately uniform sidelobe level and adaptively suppresses high level signals within the sidelobe region of each beam. In one embodiment of the invention, the implementation of the adaptive antenna system uses a series of array element modules that each perform receive functions and interface with adjacent array element modules to produce adaptable narrow beams. Several of the embodiments of the invention eliminate the use of any auxiliary elements, thus reducing the cost of implementation.

Figure 3A:
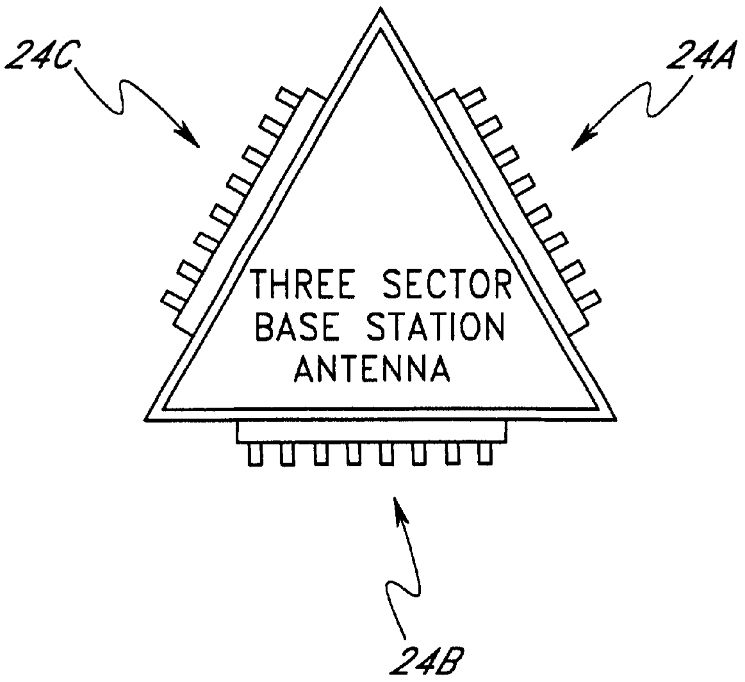
FIG. 3A–3C are a series of diagrams showing a beamformer.
Figure 3B:
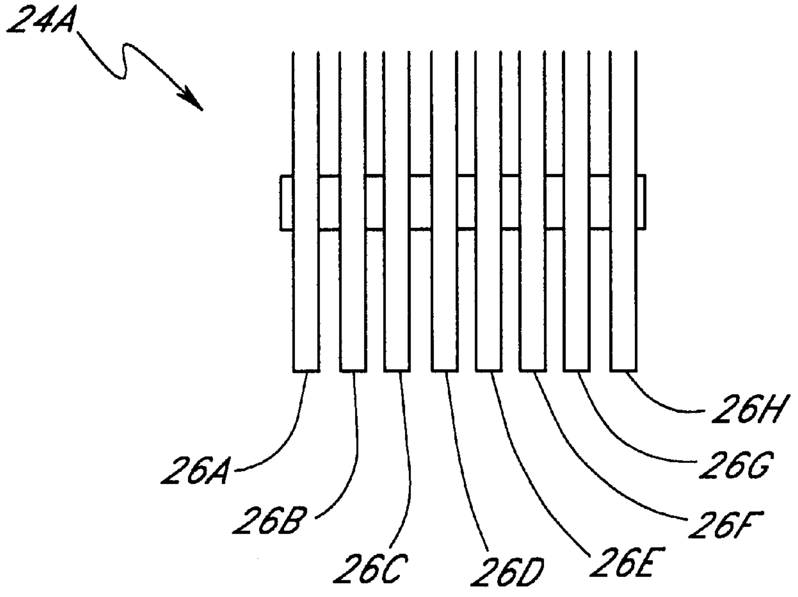
Figure 3C:
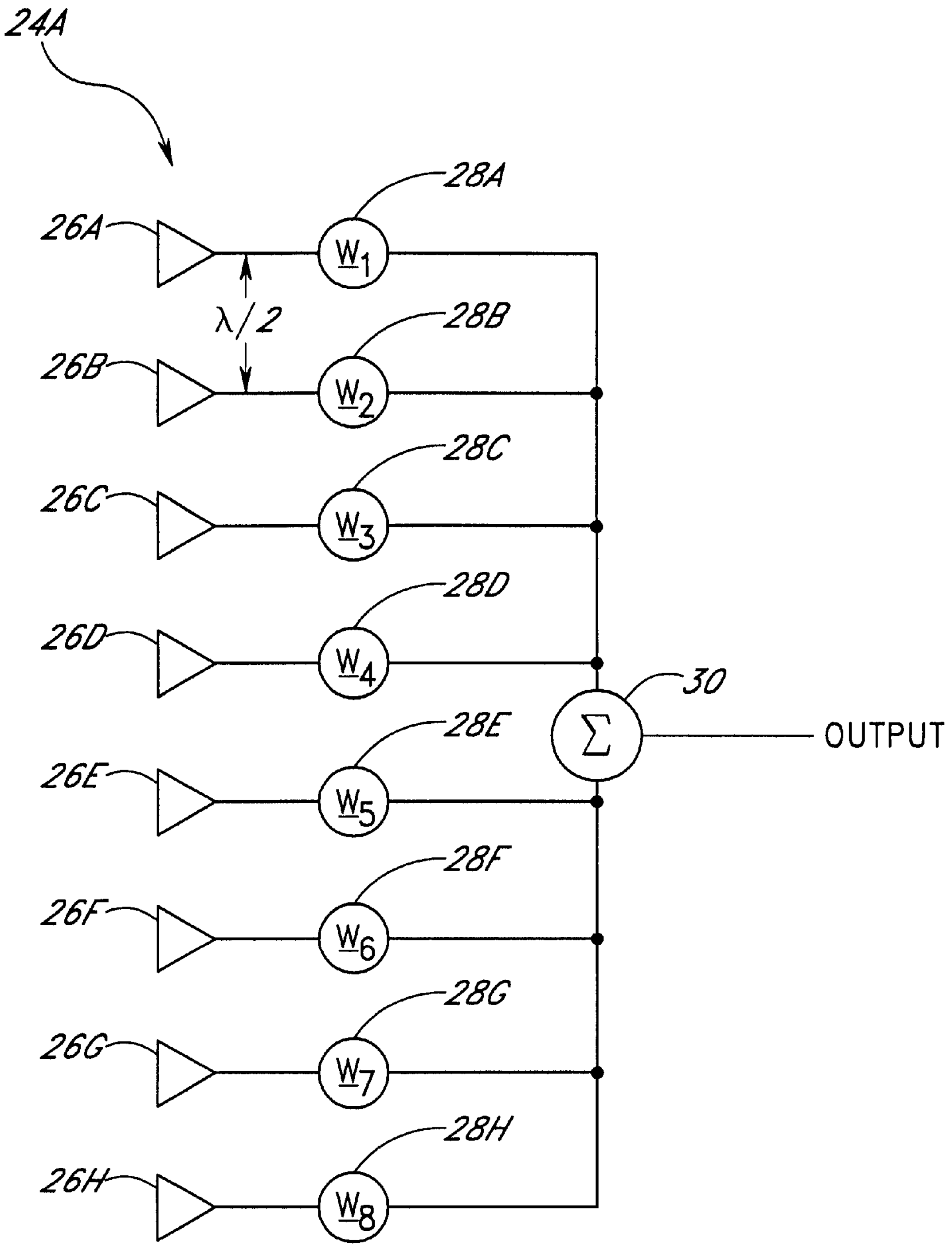
Figure 6A:
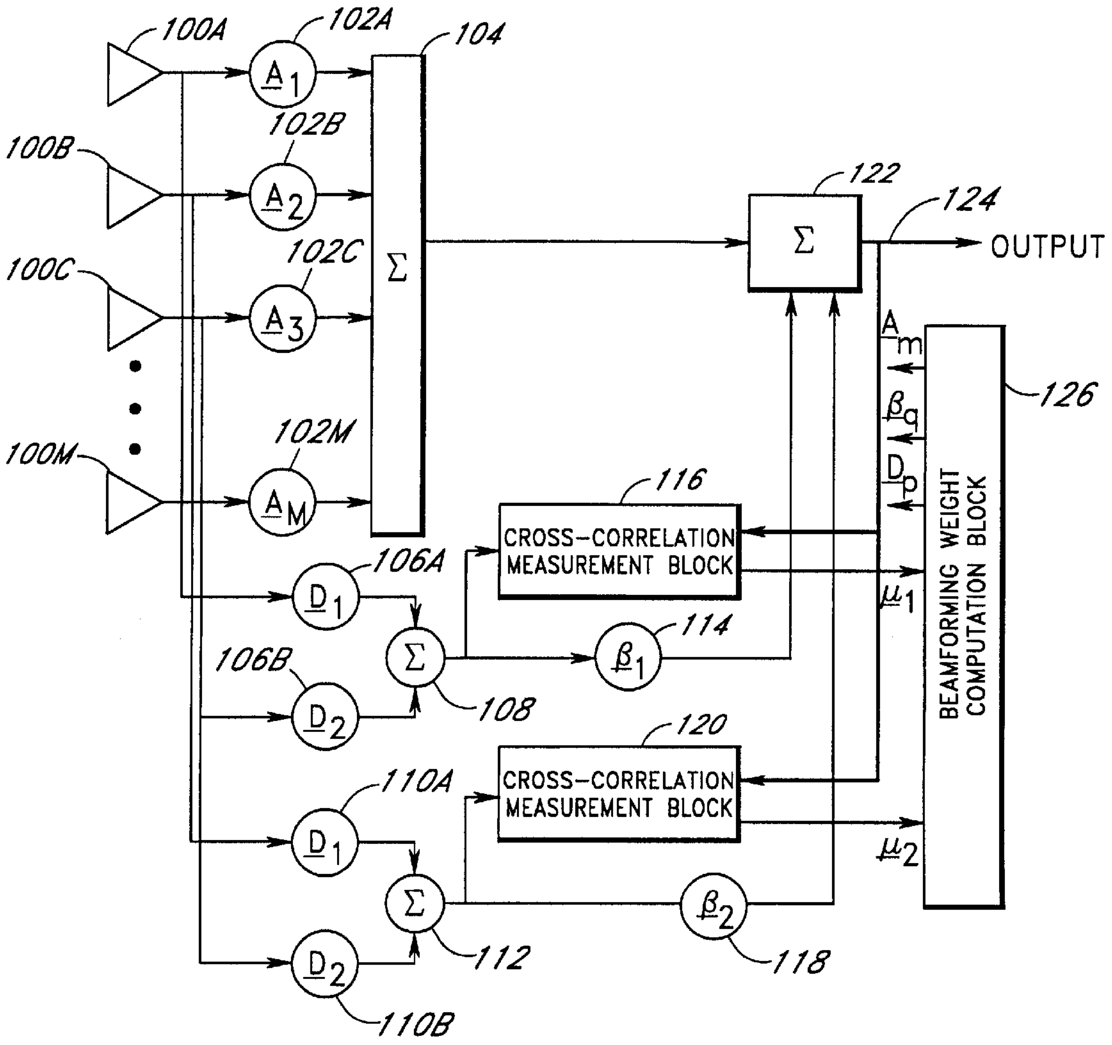
FIG. 6A–6C are block diagrams showing a coherent cancellation antenna system using phantom auxiliary beams.

FIG. 6A is a block diagram of one embodiment of an adaptive antenna system of the invention that does not require the use of separate auxiliary antenna radiators. In FIG. 6A, a set of array elements 100A–100M are coupled to a set of weighting blocks 102A–102M which apply complex weights $A_1$–$A_M$ to develop a single narrowband beam at the output of the summer 104 in a similar manner as described above with reference to FIG. 3C.

The array elements 100A–100B are also coupled to a set of weighting blocks 106A and 106B which create a first "phantom" auxiliary beam at the output of a summer 108. Because this auxiliary antenna beam is created using the same array elements 100A–100B as the main beam, no physically separate auxiliary antennas are needed. For this reason, the auxiliary antenna beams implemented in this manner are referred to as "phantom" auxiliary beams. In a similar manner that the weighting blocks 102A–102M determine the shape and direction of the narrowband main beam, the weighting blocks 106A and 106B apply complex weights $D_1$ and $D_2$ to develop a phantom auxiliary beam with a null in the direction of the narrowband main beam.

The array elements 100B–100C are also coupled to a set of weighting blocks 110A and 110B which create a second "phantom" auxiliary beam at the output of a summer 112. The weighting blocks 110A and 110B apply complex weights $D_1$ and $D_2$ to develop a second phantom auxiliary beam with a null in the direction of the narrowband main beam. Note that $D_1$ and $D_2$ are the same for each of the phantom auxiliary beams in the embodiment shown. However, they can be different if it is desired to have phantom auxiliary beams with different patterns.

The output of the summer 108 is input into a complex weighting block 114 which applies complex weight $\beta_1$. The output of the summer 112 is input into a complex weighting block 118 which applies complex weight $\beta_2$. The output of the complex weighting blocks 114 and 118 are coupled to a summer 122 which sums the output of summer 104 with the output of the complex weighting blocks 114 and 118 to produce a composite output 124.

When a signal is received through a sidelobe of main beam, the same signal is also received through the first and second phantom auxiliary beam. However, the phase and amplitude of the signal received through the main beam and the phantom auxiliary beams is different at the input to the summer 122. If the amplitude and phase is properly adjusted, the signal energy which has been received through the phantom auxiliary beams can be coherently subtracted from the signal energy received through the sidelobe of the main beam. The weighting blocks 114 and 118 are used to properly adjust the phase and amplitude of the signal energy received through the phantom auxiliary beams.

In order to adjust the complex weights $\beta_1$ and $\beta_2$ applied by the weighting blocks 114 and 118, the output 124 of the summer 122 is multiplied with the outputs of the summers 108 and 112 and the product is integrated (accumulated) in cross-correlation measurement blocks 116 and 120 to produce complex cross-correlation measurement outputs $\mu_1$ and $\mu_2$, respectively. If a signal is present both at the output of summer 122 and the summer 108, summer 112 or both, a nonzero cross-correlation measurement value is present within one or both of the complex cross-correlation outputs $\mu_1$ and $\mu_2$.

A beamforming weight computation block 126 utilizes the complex cross-correlation measurement outputs $\mu_1$ and $\mu_2$ to generate corrections which can be used to adjust the value of the complex weights, $\beta_1$ and $\beta_2$ to reduce the energy received through the sidelobes at the output of the summer 124 (i.e., to steer a null in the direction of interfering signals). At the same time, the value of the complex weights $A_1$–$A_M$ are adjusted based on open loop calculations to maintain uniform sidelobe levels. For example, in one embodiment, the beamforming weight computation block 126 implements the min-max adaptation algorithm and null steering adaptation algorithm described in detail below to determine updated values for the complex weights $\beta_1$ and $\beta_2$, and $A_1$–$A_M$.

Note that FIG. 6A shows a specific embodiment of the invention comprising two phantom auxiliary beams (Q=2), each phantom auxiliary beam coupled to two array elements (P=2). In the general, a greater or fewer number of phantom beams can be created; however, the number of phantom auxiliary beams, Q, cannot exceed (M–P+1), where P is the number of array elements utilized to form a single phantom auxiliary bean and M is the total number of array elements.

Figure 6B:
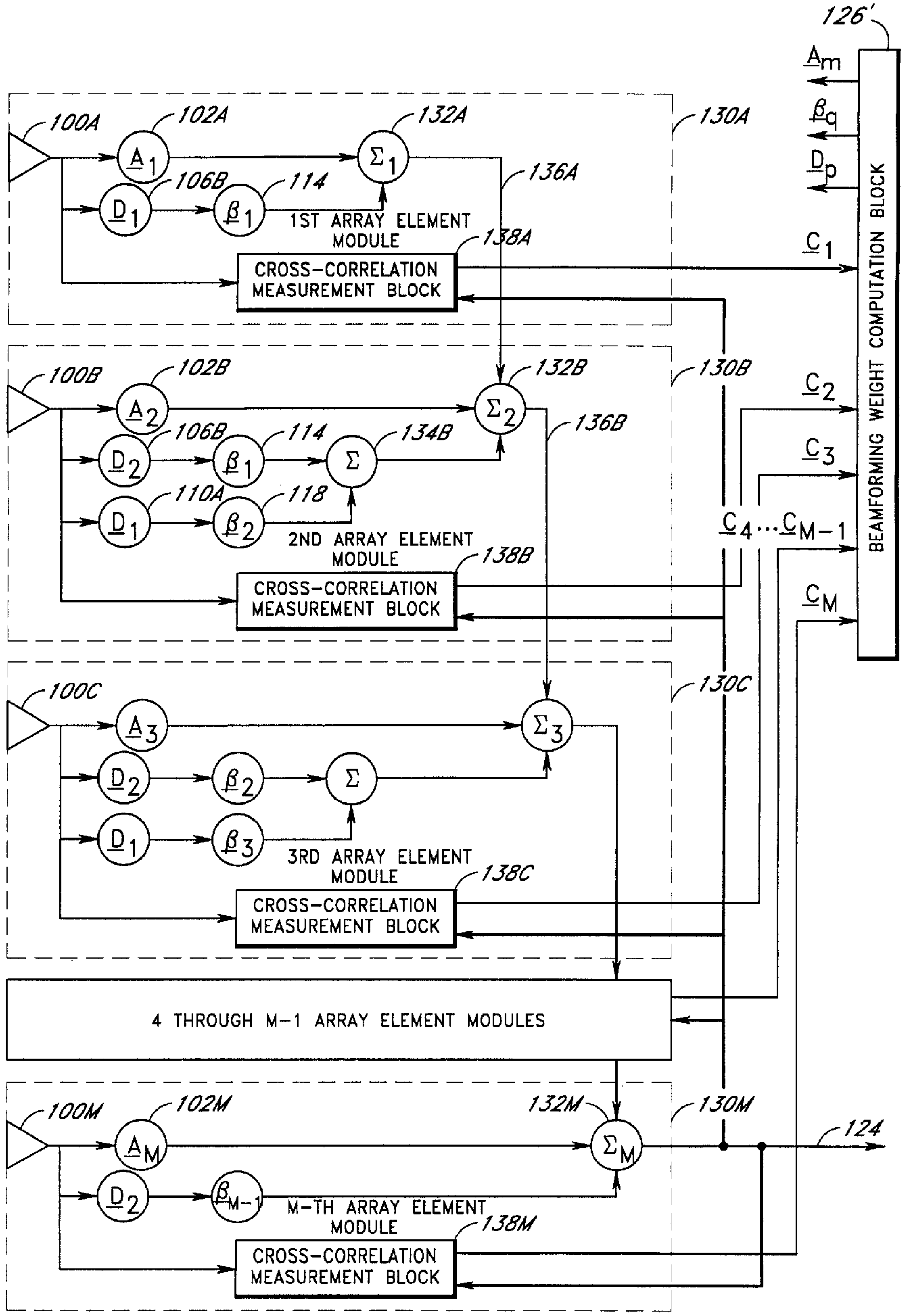

FIG. 6B is a block diagram of an antenna system which provides the same functionality as the antenna system of FIG. 6A; however, the system has been reconfigured to be implemented as a set of array element modules 130A–130M. Conceptually, to understand the metamorphosis between the configuration shown in FIG. 6A and the configuration of FIG. 6B, assume that the output 124 of FIG. 6A is logically expressed as the sum of constituent parts in which each constituent part is received through a different one of the array elements 100A–100M.

The first term in such a logical expression would express the signal energies which are received through the array element 100A. The signal energy received through the array element 100A is passed through weighting element 102A and also the weighting elements 106A and 114. Notice that, within the array element module 130A, the elements 102A, 106A and 114 as well as a summer 132A produce a signal 136A corresponding to this first constituent part of the output 124.

Likewise, the second term in such a logical expression would express the signal energies which are received through the array element 100B. The signal energy received through the array element 100B is passed through the weighting element 102B as well as the weighting elements 106B, 114, 110A and 118. Notice that, within the array element module 130B, the elements 102B, 106B, 114, 110A and 118 as well as a summer 132B produce a signal 136B corresponding to sum of the first and the second constituent parts of the output 124.

In a similar manner, each of the subsequent array element modules produces another constituent part. In this way, the output 124 of the summer 132M within the array element module 130M is the same output 124 of FIG. 6A.

The complex cross-correlation outputs $\mu_1$ and $\mu_2$ determined in FIG. 6A are not measured directly in FIG. 6B in order to reduce the computations required within the array element modules 130A–130M. Note that in FIG. 6B, the cross-correlation measurement block 136A is coupled directly to the array element 100A rather than to the sum of the output of the weighting block applying the complex weight $D_1$ and the weighting block applying the complex weight $D_2$. As in FIG. 6A, the cross-correlation measurement block 138A is also coupled to the compensated output 124. The cross-correlation measurement block 138A detects signals that are present both at the output of the array element 100A and the compensated output 124. Thus, the cross-correlation measurement samples $C_1$–$C_M$ of the cross-correlation measurement blocks 138A–138M include both signals in the sidelobes and in the main beam.

In order to determine which signal energy was received through the sidelobe, the beamforming weight computation block 126' mathematically forms the phantom array after the cross-correlation measurement. This mathematical phantom array has a null in the direction of the main beam so as to reduce the contribution of the signal energy from the main beam on the cross-correlation measurement. For example, in FIG. 6B, the beamforming weight computation block 126', the complex cross-correlation output $\mu_1$ is determined by summing the product of $C_1$ and $D_1$ with the product of $C_2$ and $D_2$. By transferring the computation function to the beamforming weight computation block 126', the number of high speed cross-correlation measurements executed within the array element modules 130A–130M is reduced and the need for the multiplication of the output of each array element with the phantom auxiliary beam weights for each sample is eliminated. Instead, the required computations can take place at the much slower adaptation update rate as part of the null steering adaptation algorithm. The beamforming weighting computation block 126' determines the complex weights applied within the array element modules 130A–130M such as, for example, according to the min-max adaptation algorithm and the null steering adaptation algorithm described below.

Figure 6C:
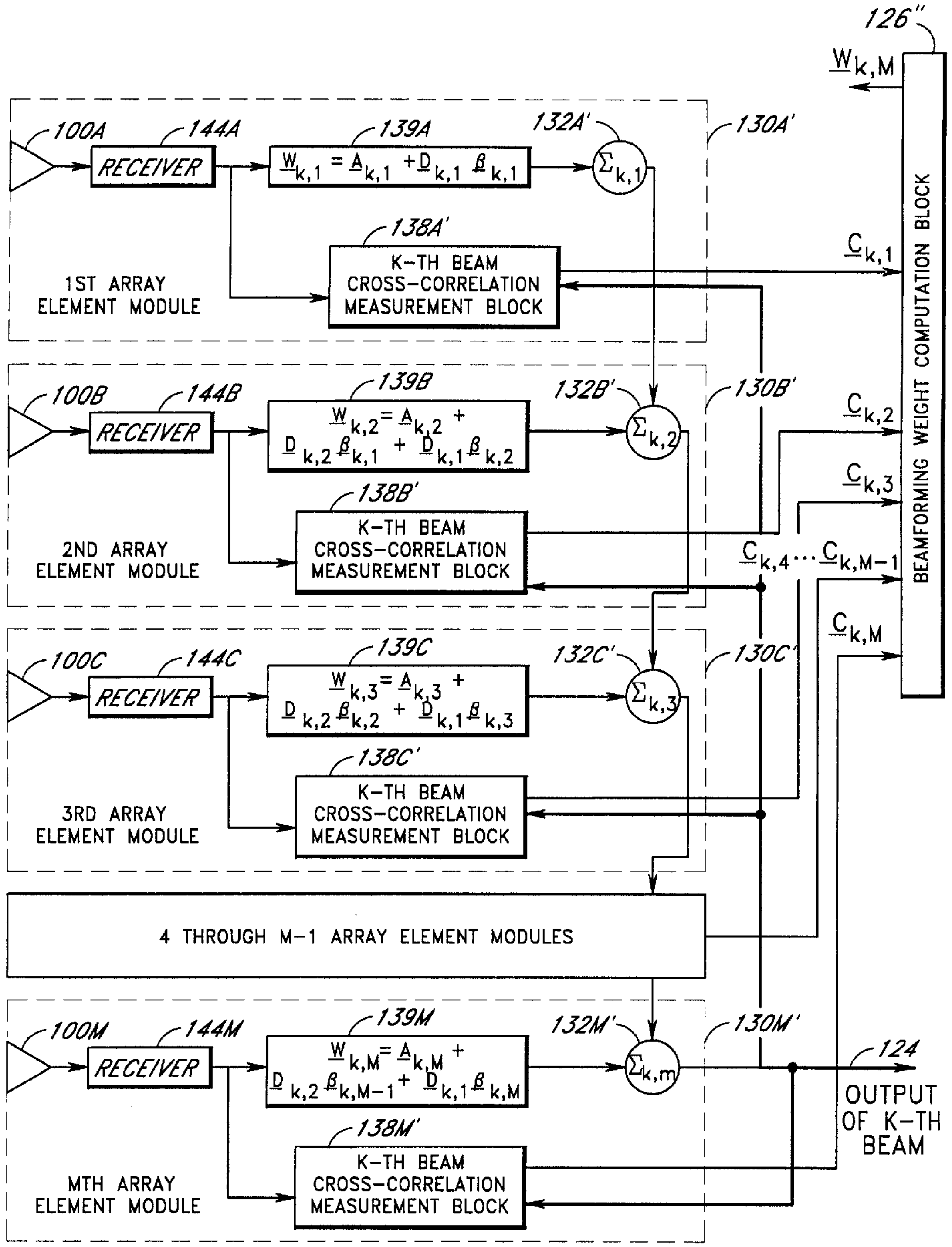

Notice that the block diagrams shown in FIGS. 6A and 6B produce output 124 which corresponds to one narrow main beam. In general, a series of narrow main beams are created to produce a composite coverage area which is much wider than a single narrow beam. FIG. 6C has been expanded to show the generation of K of these concurrent beams. In FIG. 6C, the elements subscripted with k are replicated K times to develop the K outputs corresponding to K multiple beams. Note that for the $k^{th}$ beam, the set of phantom auxiliary weighting blocks, $\{D_{k,p}, p=1 \ldots P\}$ are all the same for each of the Q phantom auxiliary beams; although, they could be different if it was desired to have phantom auxiliary beams with different patterns as noted previously.

In actual implementations, the weighting blocks are not directly coupled to the array elements. Instead, an intervening receiver is used to convert the high frequency analog signal to a series of complex (in-phase and quadrature) base-band or intermediate frequency digital samples. Thus, in FIG. 6C, receive modules 144A–144N are included in each of the array element modules 130A'–103N'. The array elements 100 and the array element modules 144 need not be replicated for each of the k beams and are used by each narrow-band main beam k.

In addition, FIG. 6C shows the continued metamorphosis of the weighting and cross-correlation measurements that further simplify the computation. Specifically, for the $k^{th}$ beam of each array element module, a composite weighting block 139 applies a composite complex weight, $W_{k,m}$. The value of the composite complex weight, $W_{k,m}$ is determined based on the values of the complex weights, $A_{k,1}$–$A_{k,M}$, as well as the phantom auxiliary complex weights, $D_{k,1}$–$D_{k,P}$, and $\beta_{k,1}$–$\beta_{k,Q}$. Thus, as compared to the array element module 130A, within the array element module 130A', the elements 102A, 106B and 114 have replaced with the single weighting block 139A. As compared to the array element module 130B, within the array element module 130B', the elements 102B, 106B, 114, 134, 110A and 118 have been replaced with the weighting block 139B.

The configuration of FIG. 6C has several advantages over the configuration of FIG. 6A. It is advantageous to digitize the signal at the input to the weighting blocks as performed by the receivers 144A–144M in FIG. 6C in order to reduce the size and cost, and to increase the accuracy and repeatability of the array element modules 130A'–130M'. The use of a single composite complex weight, $W_{k,m}$, by the beamforming weight computation block 126 reduces the number of complex multiplies to one per array element module for each of the $k^{th}$ beams. There is further cost advantage in that the architecture lends itself to the use of repeated modules. Based upon this realization, the configuration of FIG. 6C decreases the complexity of the elements corresponding to a single adaptive beam, k. Specifically, the number of cross-correlation measurements which are performed is reduced to equal the number of antenna array element modules, M.

Figure 7:
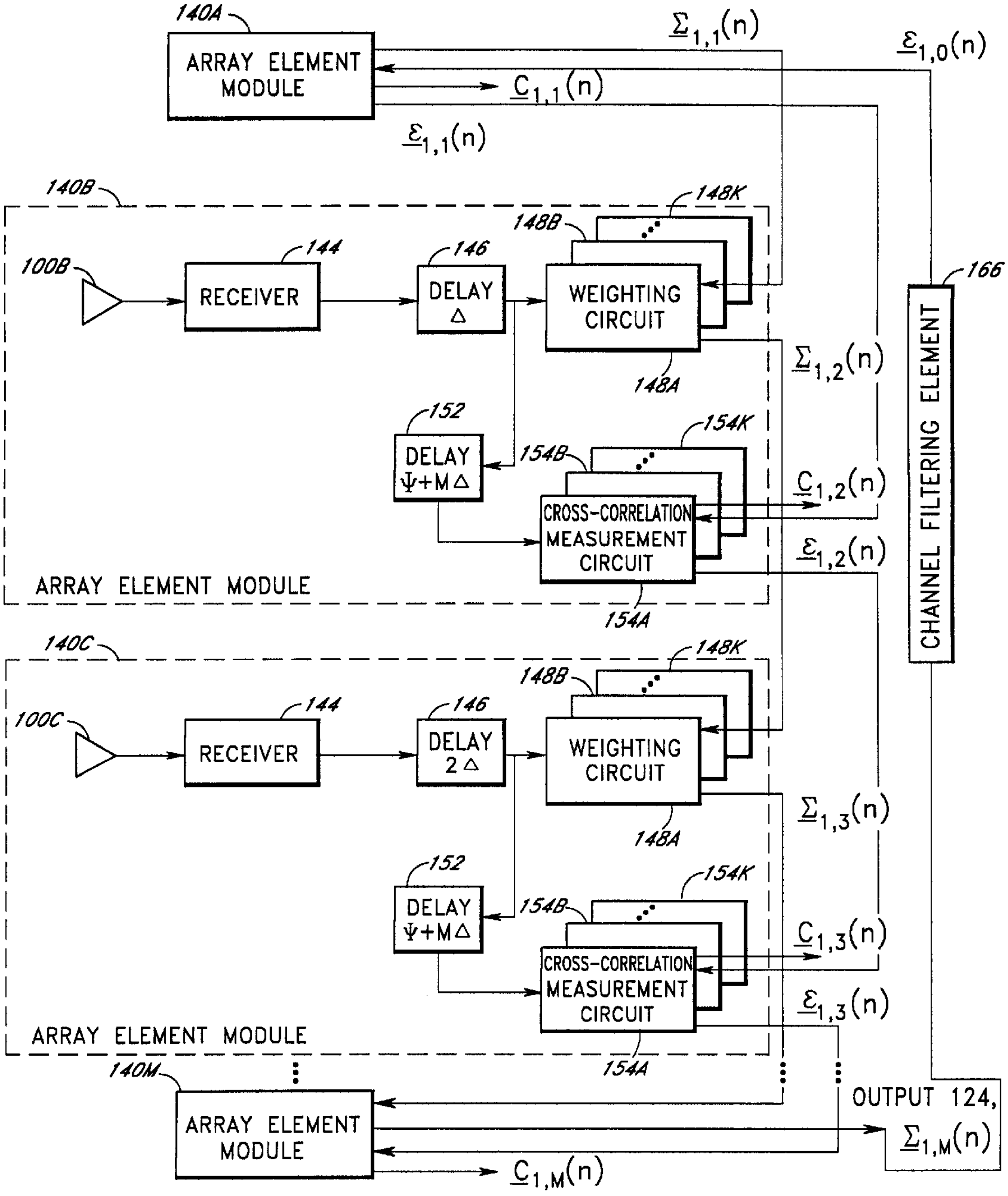
FIG. 7 is a block diagram showing array element modules integrated into a smart antenna receiver according to the invention.

FIG. 7 is a detailed block diagram of one embodiment of the invention showing the delays inserted by the array element module 140A–140M and their interconnection with one another. The modular and common architecture of each of the array element modules 140 allows them to be concatenated with one another so that they may be utilized in a variety of operating environments using different the numbers of array elements (M), concurrent main beams (K) and phantom auxiliary beams (Q). The array element modules 140B and 140C shown in detail in FIG. 7 are representative of each of the modules 140A–140M.

The array element 100B within the array element module 140B is coupled to the receiver 144 which implements the down conversion and digitization of the received signal to a base-band signal. For example, in one embodiment, the conversion is accomplished using translating delta-sigma modulators and decimation filtering. In another embodiment, the receiver 144 is implemented using standard balanced mixers or other continuous time elements and the resultant analog signal is digitized in an analog-to-digital converter. In yet another embodiment, the receiver 144 utilizes a two-step conversion process using one or more intermediate frequencies (IF). In any case, the direct converter 144 produces base-band digital receive samples corresponding to both an in-phase path and quadrature path, in the preferred embodiment. The digital nature of the receive samples output by the receiver 144 allows the digital samples to be replicated without effecting the quality or noise content of the signal.

To assist in implementing the concatenated summation function, the output of the receiver 144 is coupled to a programmable delay element 146. The array element modules 140A–140M perform a sequential summation process which produces the composite output 124 at the output of array element module 140M. Due to the sequential nature of the summation process (often referred to as a "daisy chain" connection), the summation process executed within an arbitrary array element module, 140*m*, can be completed only when the previous array element module, 140*m*−1, has completed its summation process. Thus, the delay element 146 inserts a delay to time align the receive samples received by the array element module 140B with the summation output produced by the array element module 140A. Thus, the delay element 146 inserts a delay of $(m-1)\Delta$ where $\Delta$ is the delay associated with executing the weighting process in one array element module.

The output of the delay element 146 is coupled to K parallel weighting circuits 148A–148K which apply the composite complex weights, $W_{k,m}$. For each arbitrary beam, k, associated with the receiver, a separate weighting circuit 148*k* is used. The functions executed by the weighting circuits 148A–148K are discussed in more detail below with reference to FIG. 9. In general, the weighting circuit 148A multiplies the delayed digital samples by the adapted, complex weighting function. In addition, the weighting circuit 148A sums the output of the weighting circuit of the previous array element module with the results of the weighting process to produce a composite output which is coupled to the next array element module. To avoid cluttering FIG. 7, the concatenated connections are illustrated only for the weighting circuit 148A for the first beam of the array element modules 140A–140M, i.e. beam k=1.

The output of the weight circuit 148A of the last array element module 140M is the composite output signal 124, $\Sigma_{1,M}(n)$. The composite output signal 124 is input into a channel filtering element 166. The channel filtering element 166 is used to filter signal which are outside of the channel of interest and serves to reduce the level of signal energy which is received outside the signal bandwidth. For example, in a typical CDMA system, a wideband channel is used, such as 1.25 MHz signal bandwidth. Subsequent channel processing is used to reject interference which is outside of the signal bandwidth. Thus, it is not necessary to use the smart antenna to reduce the level interference received outside of the signal bandwidth. Thus, the adaptation error signal, $\epsilon_{k,0}(n)$, is the complex conjugate of a band-limited version of the composite output signal, $\Sigma_{k,M}(n)$. Thus, in the first array element module (m=1), the complex adaptation error signal, $\epsilon_{k,0}(n)$, is used as the input to the cross-correlation measurement circuit 154.

Referring again to the elements within the array element module 140B, the output of the delay element 146 is also coupled to a delay element 152. In one embodiment, the delay elements 146 and 152 are implemented in parallel or with one structure. The delay element 152 inserts a delay to time align the receive samples received by the array element module 140B with the complex adaptation error signal $\epsilon_{k,1}(n)$ produced by the array element module 140A. Thus, the delay element 152 inserts a delay of $M\Delta+\psi$ where $M\Delta$ is the total delay associated with executing the weighting process and $\psi$ is the delay associated with the channel filtering element 166.

The output of the delay element 152 is coupled to a bank of cross-correlation measurement circuits 154A–154K. Each of the cross-correlation measurement circuits 154A–154K are assigned to one of the K antenna beams. In general, the cross-correlation measurement circuits perform a function similar to the cross-correlators 138A'–138M' of FIG. 6C. The specific operation of the cross-correlation measurement circuits 154A–154K is described in more detail subsequently herein with reference to FIG. 10.

To simplify the diagram, several connections which control the block diagram of FIG. 7 are not shown therein. For example, in general, each of the array element modules 140A–140M receives an analog or digital frequency reference which can be used in the down conversion process as well as to generate a clock, such as to generate digital samples. In addition, each array element module 140A–140M receives module control information such as used to set the delay of the delay elements 146 and 152. In addition, the weighting circuits 148A–148K are coupled to a control signal which periodically updates the composite complex weights, $W_{k,m}$. Also the output of the cross-correlation measurement circuits 154A–154K for the $m^{th}$ array element module and the $k^{th}$ beam is an cross-correlation measurement sample, $C_{k,m}(i)$.

Figure 8:
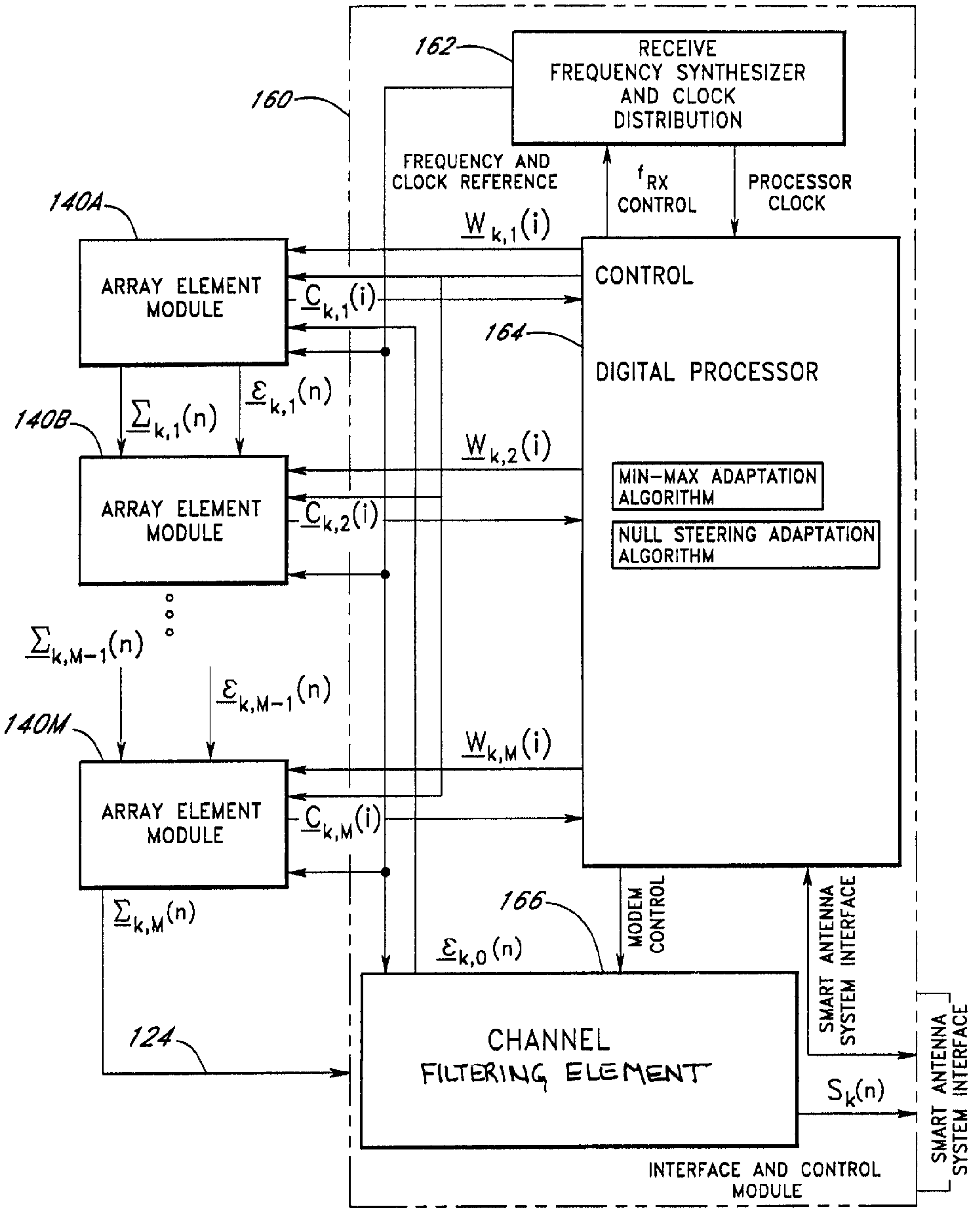
FIG. 8 is a block diagram showing the array elements and multi-beam modules integrated into an adaptive receiver system.

FIG. 8 is a block diagram showing the array element modules integrated into an adaptive receiver system. As illustrated above in FIG. 7, the array element modules 140A–140M are cascaded in series. Although each of the array element modules 140A–140M receives inputs and generates outputs for each of K antenna beams, the input and output for only the first antenna beam, k, is shown in FIG. 8 in order to avoid excessively cluttering the diagram.

In addition to these elements, FIG. 8 also shows interface and control module 160, which among other tasks, performs a function similar to the beamforming weight computation block 126, 126' and 126" of FIGS. 6A, 6B and 6C, respectively. The interface and control module 160 comprises a receive frequency synthesizer and clock distribution circuit 162 which generates reference signals for use by the various components of the adaptive receiver system. The interface and control module 160 also comprises the channel filtering element 166. The channel filtering element 166 is coupled to the composite output 124 of the final array element module 140M, $\Sigma_M(n)$. The channel filtering element 166 provides band-pass or base-band filtering of the output 124 which is then utilized as both adaptation error signal for the $k^{th}$ beam cross-correlation measurements and as the output of the $k^{th}$ beam.

The interface and control module 160 also comprises a digital processor 164. Based upon calibration data for the array elements and the received cross-correlation measurement samples $C_{k,1}(i)$–$C_{k,M}(i)$, the digital processor 164 generates the composite complex weights, $W_{k,1}(i)$–$W_{k,M}(i)$. In one embodiment, the digital processor runs a min-max adaptation algorithm as well as a null steering adaptation algorithm as explained in more detail below.

Figure 9:
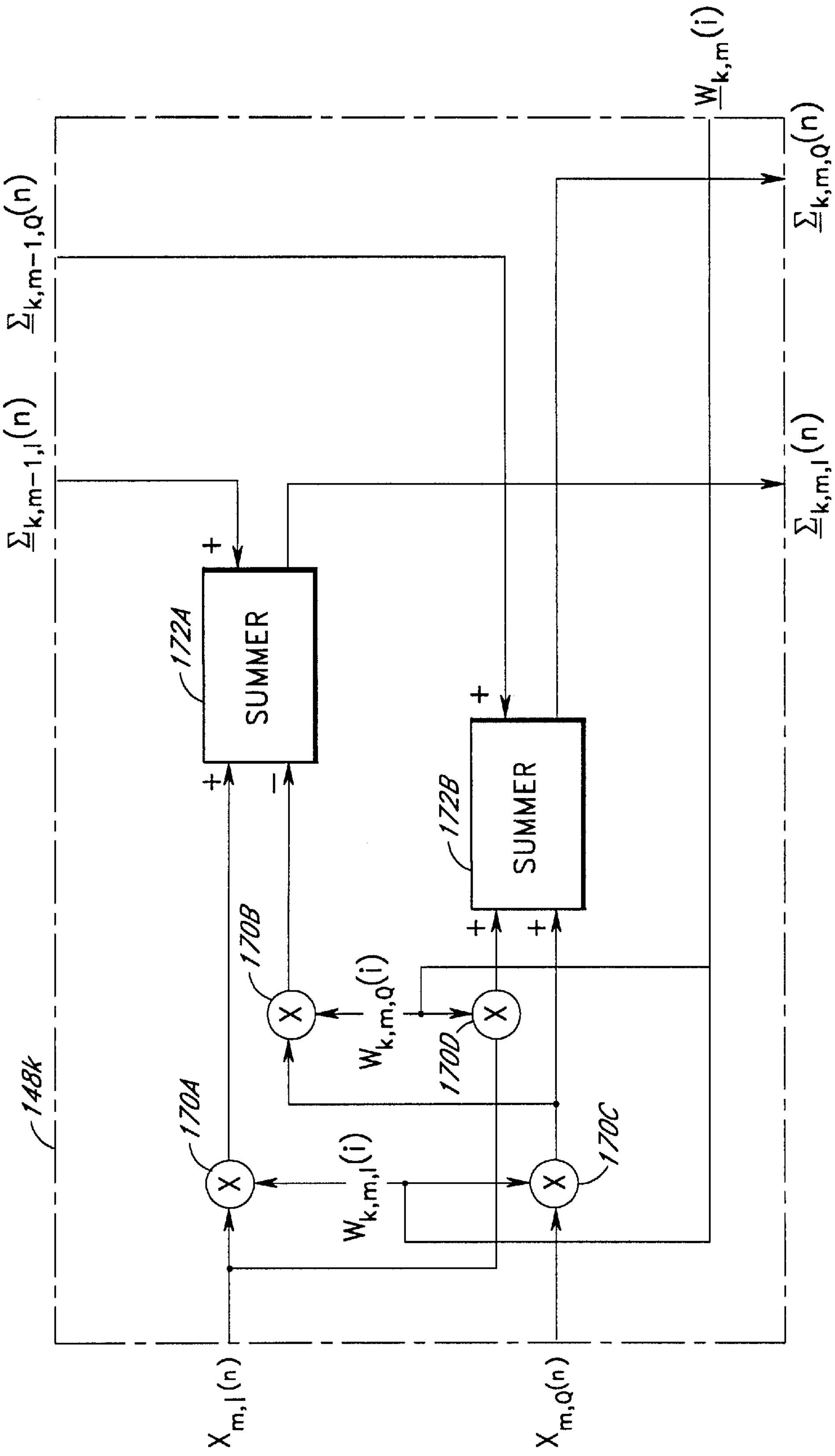
FIG. 9 is a block diagram showing a weighting circuit within an array element module in detail.

FIG. 9 is a block diagram showing a weighting circuit 148*k* within the array element module 140*m* in detail. The weighting circuit 148*k* receives the components $X_{m,1}(n)$ and $X_{m,Q}(n)$ of the complex receive samples which are coupled to multiplying units 170A and 170C, respectively. The multiplying units 170A and 170C multiply the incoming samples by the composite weight for the I channel, $W_{k,m,I}(i)$. In addition, the components $X_{m,I}(n)$ and $X_{m,Q}(n)$ of the complex receive samples are coupled to multiplying units 170D and 170B, respectively. The multiplying units 170B and 170D multiply the incoming samples by the composite weight for the Q channel, $W_{k,m,Q}(i)$. Together, the multiply units 170A–170D perform the complex multiplication of the complex receive samples, $X_m(n)$, by the composite complex weight, $W_{k,m}(i)$.

The output of multipliers 170A and 170B are coupled to the summer 174A. The summer 174A also sums these inputs with the output of the previous weighting circuit in the daisy chain, $\Sigma_{k,m,I}(n)$ to produce the in-phase output of the current weighting circuit, $\Sigma_{k,m,Q}(n)$.

The output of multipliers 170C and 170D are coupled to the summer 174B. The summer 174B also sums these inputs with the output of the previous weighting circuit in the daisy chain, $\Sigma_{k,m-1,Q}(n)$ to produce the quadrature output of the current weighting circuit, $\Sigma_{k,m,Q(n)}$.

Figure 10:
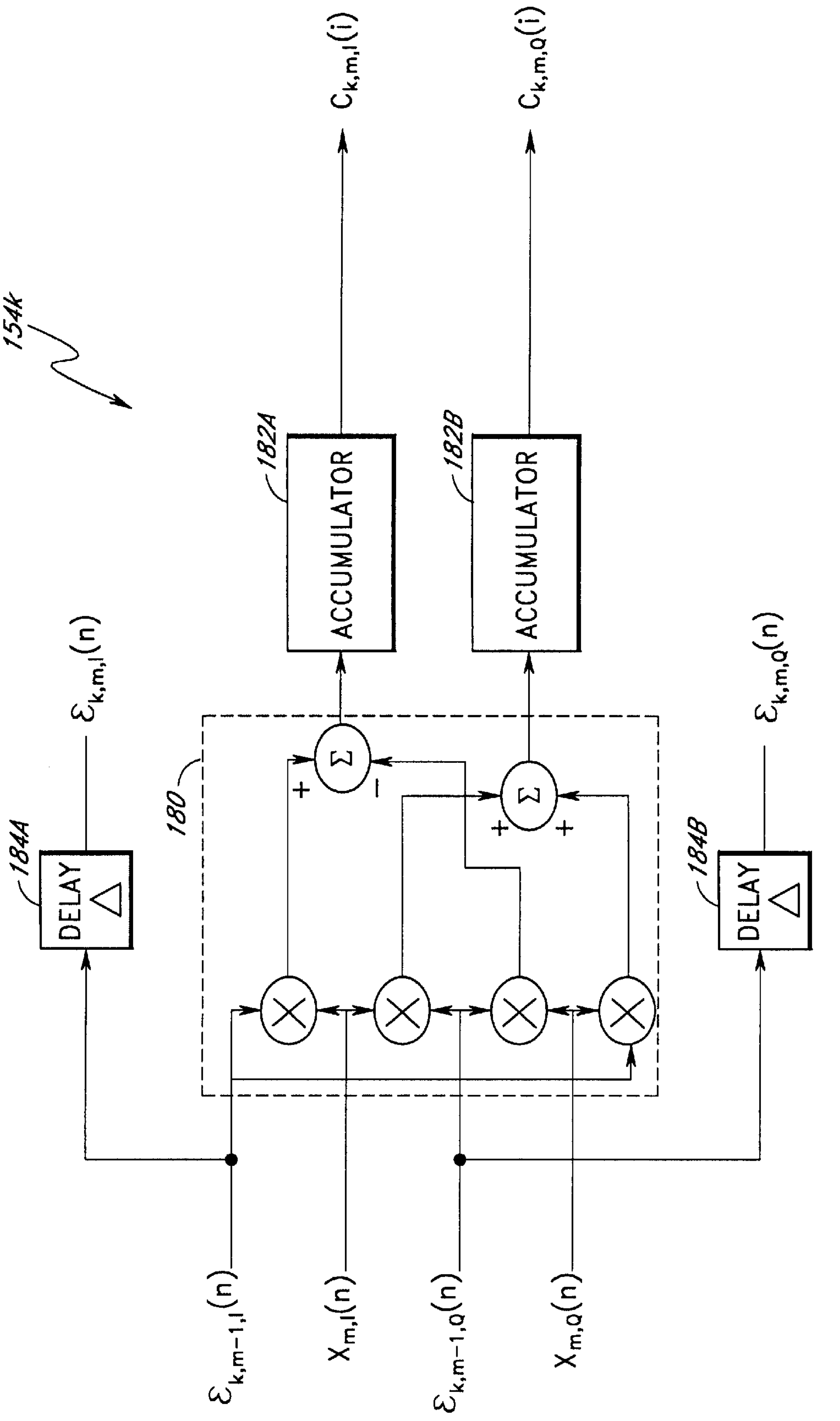
FIG. 10 is a block diagram showing a cross-correlation measurement circuit within the array element module in detail.

FIG. 10 is a block diagram showing a cross-correlation measurement circuit 154*k* within the array element module 140*m* in detail. The complex adaptive error signal, $\epsilon_{k,m}(n)$, is cascaded through the series of cross-correlation measurement circuits 154*k* in each of the M array element module 140*m*. In this case, because the effects of the phantom antenna elements weights, $D_{k,1}$ and $D_{k,2}$, are imposed by the digital processor 164, the complex adaptive error signal, $\epsilon_{k,0}(n)$, input in to the first array element module 140A is the output 124, $\Sigma_{k,M}(n)$, of the final array element module 140M filtered by the channel filtering element. Each cross-correlation measurement circuit 154*k* delays the error signal by Δ so that the error signal arrives at successive cross-correlation measurement circuits 154*k* aligned in time with the digital antenna samples received by the corresponding array element module 154*m*. Delay blocks 184A and 184B function to provide this delay.

The complex receive samples, $X_m(n)$, are multiplied with the complex adaptation error signal, $\epsilon_{k,m}(n)$, in a complex multiplier 180 which operates in a similar manner to the complex multiplier shown in FIG. 9. The in-phase samples output by the complex multiplier 180 are summed in an accumulator 182A which produces the in-phase cross-correlation measurement samples, $C_{k,m,I}(i)$. The quadrature samples output by the complex multiplier 180 are summed in an accumulator 1 82B which outputs the quadrature cross-correlation measurement samples, $C_{k,m,Q}(i)$.

Using the block diagrams and notation developed above, the method and operation of beamforming according to the min-max adaptation algorithm and the null steering adaptation algorithm can be described mathematically. As noted above, the signal input to the $k^{th}$ weighting circuit within the $m^{th}$ multi-beam receive module is a high resolution, digitized complex receive samples $X_m(n)$ where, as mentioned above, the underscoring indicates that the signal is complex (i.e. has both in-phase and quadrature components.) As shown in FIG. 9, within the weighting circuit 148*k*, the composite complex weight, $W_{k,m}(i)$ are multiplied by the complex receive samples, $X_m(n)$. The resultant output for the $k^{th}$ beam at each array element module is then given by the Equation 1.

$$\Sigma_{k,m}(n)=W_{k,m}(i)X_m(n)+\Sigma_{k,m-1}(n) \qquad \text{Eq. 1}$$

wherein:

$\Sigma_{k,m}(n)$ is the output of the $m^{th}$ weighting circuit for the $k^{th}$ beam at sample time n;

$\Sigma_{k,m-1}(n)$ is the output of the previous $(m-1)^{th}$ weighting circuit for the $k^{th}$ beam at sample time n;

$W_{k,m}(i)$ is the composite complex weight for the $k^{th}$ beam and the $m^{th}$ array element module at iteration i;

$X_m(n)$ is the complex receive sample of the $m^{th}$ array element module at sample time n;

n is the sample index.

Based on Equation 1, the resultant output signals of the last weighting circuit in the last array element module M for the $k^{th}$ beam is given in Equation 2.

$$\underline{\Sigma}_{M,k}(n)=\underline{W}_{kM}(i)\underline{X}_M(n)+\underline{\Sigma}_{kM-1}(n)=\sum_{m=1}^{M}\underline{W}_{k,m}(i)\underline{X}_m(n) \qquad \text{Eq. 2}$$

Adaptive Beamforming

In one embodiment, the composite complex weights, $W_{k,m}(i)$, are determined by both the min-max adaptation algorithm and the null steering adaptation algorithm. The purpose of the null steering adaptation algorithm is to steer a null in the direction of any interfering signals received through the sidelobes without significantly effecting the main beam. By interactively moving the nulls of the adaptive antenna pattern in the direction of the measured interfering signals as described below, the null steering adaptation algorithm tends to steer a null in the direction of an interfering signal received through the sidelobe region according to current operating conditions. The purpose of the min-max adaptation algorithm is to limit the maximum value of the gain of the side lobes such as, for example, maintaining a relatively uniform gain of the sidelobes or maintaining the sidelobes below some predetermined maximum. In general, a decrease in the gain of one sidelobe (such as might be caused by the placement of a null within the sidelobe) causes an increase in the gain of another one of the sidelobes. By reducing the gain of the sidelobe with the largest gain, the min-max adaptation algorithm tends to maintain the sidelobes at a relatively uniform gain.

Figure 1:
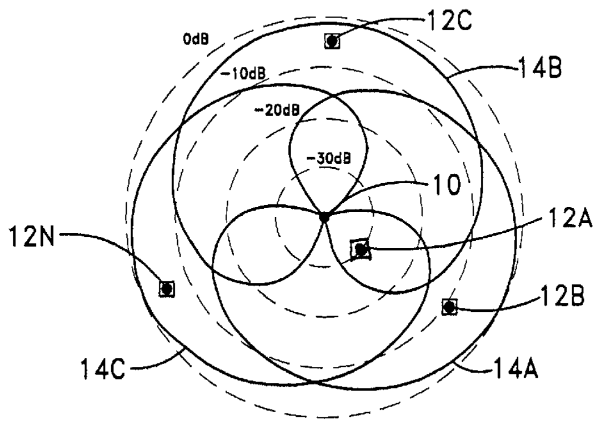
FIG. 1 is a representative diagram showing a three-sectored base station and its ideal corresponding coverage area.
Figure 2B:
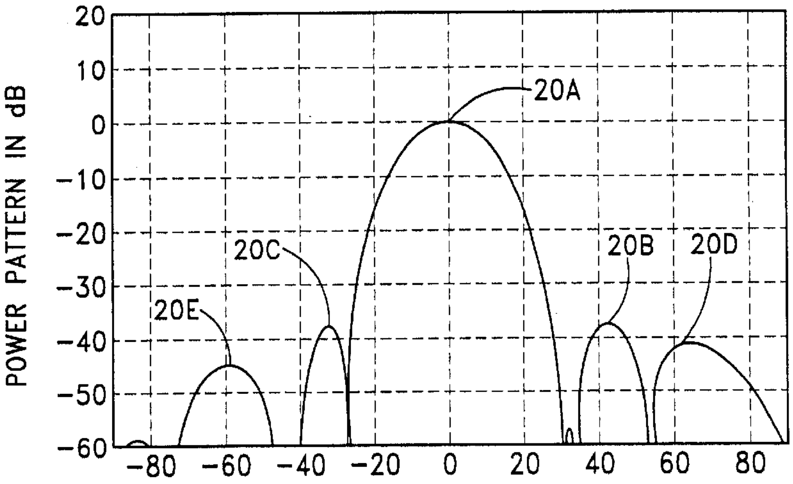
FIGS. 2A–2C are representative diagrams showing the coverage area pattern for a typical narrow beam.
Figure 2A:
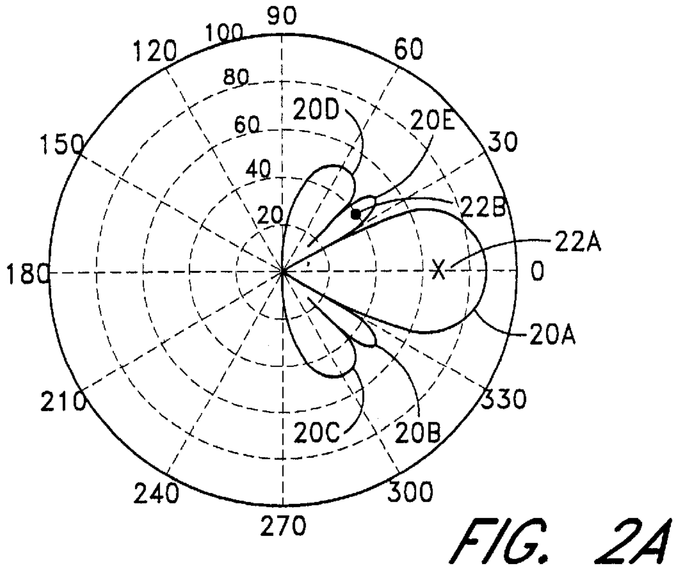
Figure 2C:
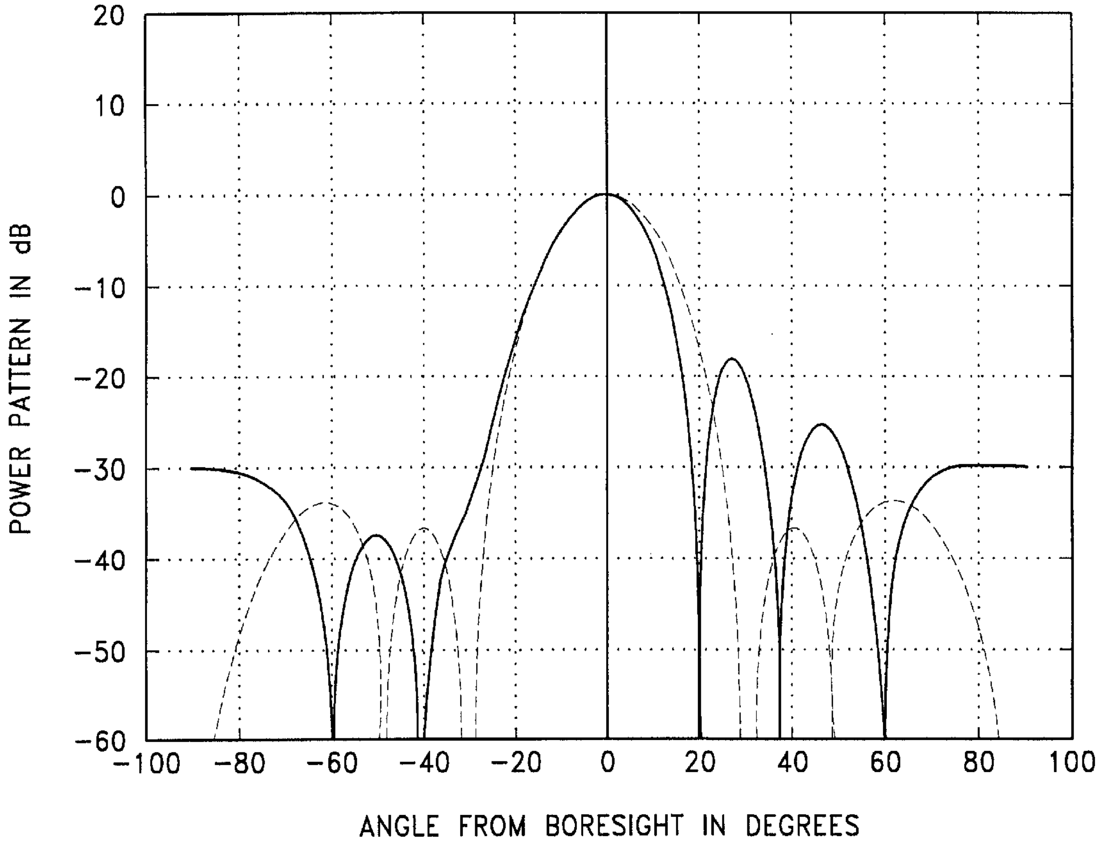
Figure 11:
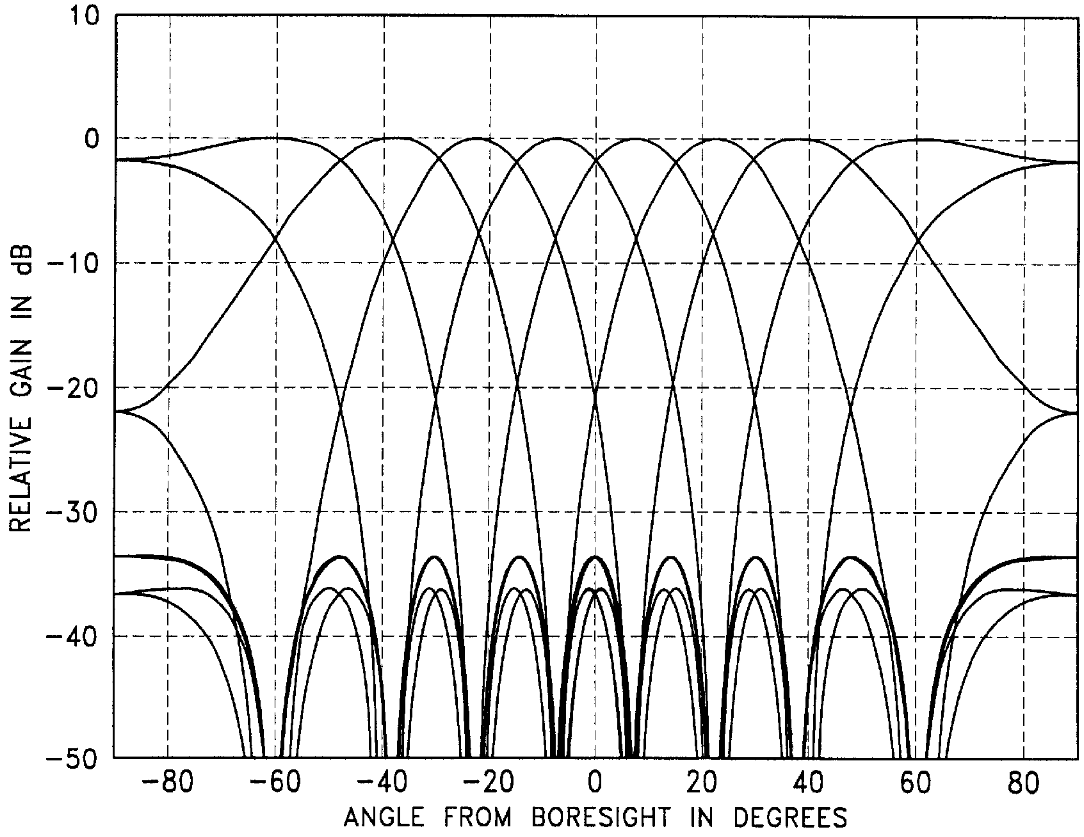
FIG. 11 is a graph showing the gain of an eight beam (k=8), 120 degree coverage area.

FIG. 11 is a graph showing the gain pattern of an eight beam (k=8) array which has been designed to provide coverage of a 120 degree azimuth sector. Each beam is designed to cover a sub-sector of approximately 15 degrees with a two dimensional beam pattern similar to the one shown in FIGS. 2A and 2B. The maximum un-adapted gain of the sidelobes of the eight main beams are shown to be more than 30 dB below the maximum gain of the main beams.

Figure 12:
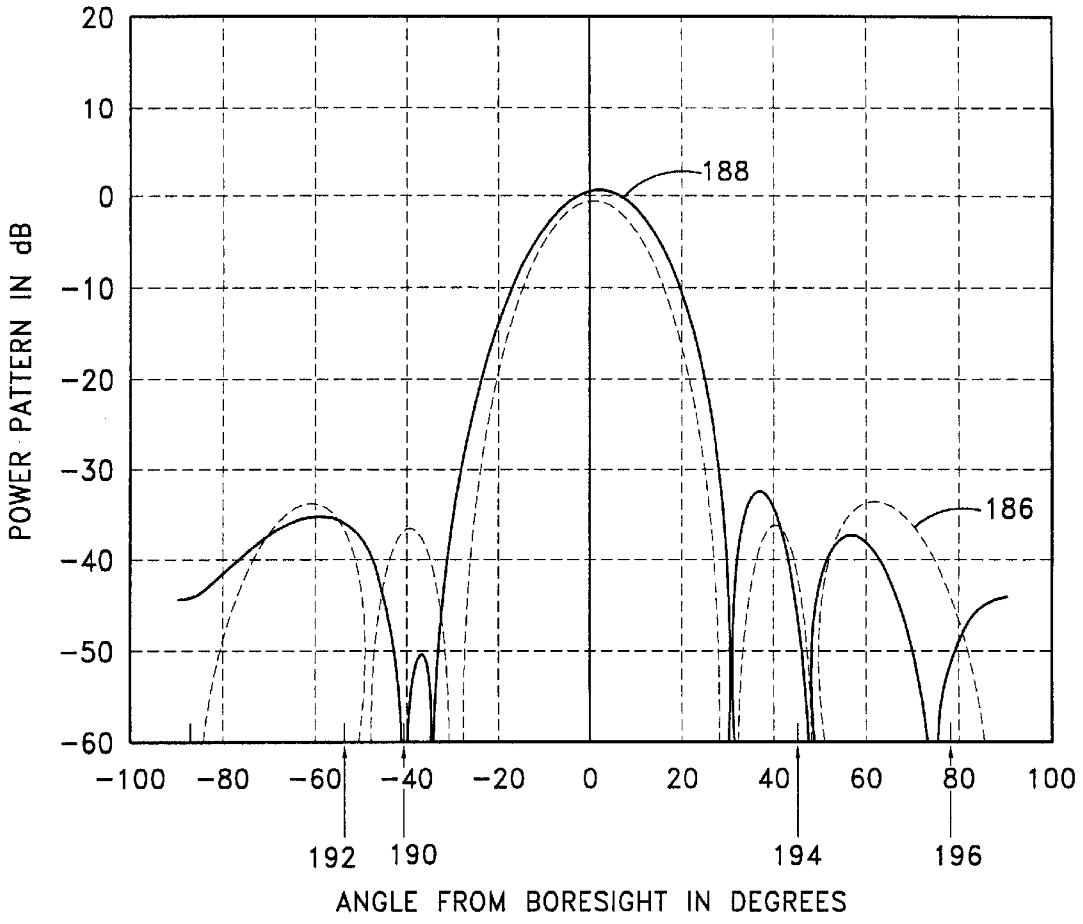
FIG. 12 is a graph showing the a single un-adapted beam pattern in dashed lines and a beam pattern adapted according to the invention in solid lines.

FIG. 12 is a graph showing the a single un-adapted beam pattern in dashed line 186 and an adapted beam pattern in solid line 188. Note that the un-adapted beam pattern has a regular sidelobe pattern. In FIG. 12, a mobile station signal 190 is received at approximately −42 degrees from boresight, a mobile station signal 192 is received at approximately −52 degrees from boresight, and mobile station signals 194 and 196 are received at approximately 44 and 78 degrees from boresight, respectively.

The solid line in FIG. 12 represents the adapted beam pattern. Note that the main lobe has been effected to some extent but not significantly. As noted above, the energy received from the mobile stations operating in the coverage area of the sidelobes acts as interference to the mobile stations operating in the main beam coverage area. Therefore, it is advantageous to steer an antenna null in the direction of the mobile station generating an interfering signal to reduce the interference level generated by these signals. In FIG. 12, notice that nulls have been steered at approximated, −40, 46 and 76 degrees by the null steering adaptation algorithm. In this way, the adaptive gain of the beam at the angle at which the mobile station signal 190 is reduced from an un-adapted value of about −36 dB to an adapted gain of less than −60 dB. Likewise, the adaptive gain of the beam at the angle at which the mobile station signal 194 is received is reduced from an un-adapted value of about −40 dB to an adapted gain of about −45 dB. Similarly, the adaptive gain of the beam at the angle at which the mobile station signal 196 is received is reduced from an un-adapted value of about −45 dB to an adapted gain of less than −50 dB.

Comparing the adapted and un-adapted beams, notice that the maximum absolute value of the sidelobes has not increased substantially. For example, the maximum absolute value of the un-adapted sidelobes is approximately −34 dB at about +/−61 degrees from boresight and the maximum absolute value of the adapted sidelobes is approximately −33 dB at about +35 degrees from boresight. The min-max adaptation algorithm functions to maintain this relatively constant sidelobe level throughout the adaptation process. By doing so, some accuracy in the placement of the nulls with the null steering adaptation algorithm is sacrificed to the process of maintaining relatively even sidelobes by the min-max adaptation algorithm.

For example, if another null were to be placed at the location of the mobile station signal 192, the gain of the resulting sidelobe would be substantially higher than −35 dB. Likewise, if the null at 47 degrees were moved closer to mobile station signal 194 (and, hence, closer to the main lobe), the gain of the first sidelobe would continue to increase. Without the use of the min-max adaptation algorithm, the sidelobe gains might increase to be nearly as large as the main beam or even larger. In such a situation, a problem occurs if a new mobile station signal (or a new multipath signal from one of the existing mobile stations) develops within the high gain region of the sidelobe. The interference received through the high gain sidelobe can be very detrimental to system operation until the null steering adaptation algorithm can react to compensate for the new signal. Therefore, it is advantageous to limit the maximum gain in the sidelobes to prevent these high levels of interference.

In one embodiment, the gain of the sidelobe is limited to an absolute level. In other embodiments, the gain of the sidelobe can be limited with respect to the main lobe or some other reference or with respect to one another (i.e. the sidelobes are maintained *at a uniform level).

Although the relative amplitude of the mobile station signals is not shown in FIG. 12, in reality, the interference caused by the mobile station signals is both a function of the gain of the antenna and the amplitude of the mobile station signal. With reference to the adaptation pattern developed in FIG. 12, the mobile station signal 192 may be relatively low power in comparison with the others and, hence, it does not require a decrease in the antenna gain in comparison to the mobile station signal 190.

Equation 3 illustrates the mathematical relationship between the min-max adaptation algorithm output, the null steering adaptation algorithm output and composite transfer weight for the $k^{th}$ beam.

$$W_{k,m}(i)=A_{k,m}(i)-B_{k,m}(i) \qquad \text{Eq. 3}$$

wherein:

- $A_{k,m}$(i) is the complex weight as determined by the min-max adaptation algorithm for the $k^{th}$ beam of the $m^{th}$ module;
- $B_{k,m,}$(i) is the complex weight as determined by the null steering adaptation algorithm for the $k^{th}$ beam of the $m^{th}$ module; and
- i is the adaptation index which typically runs at slower rate than the sample index n.

For example, referring again to FIG. 6C, the value of the composite complex weight, $W_{k,1}$, is equal to $A_{k,1}+D_{k,1}\beta_{k,1}$ and value of the composite complex weight $W_{k,2}$ is equal to $A_{k,2}+D_{k,2}\beta_{k,1}+D_{k,1}\beta_{k,2}$. Thus, comparing Equation 3 with these equations, note that $B_{k,m}$ is a function of the phantom auxiliary complex weights, $D_{k,1}$–$D_{k,P}$, and $\beta_{k,1}$–$\beta_{k,Q}$.

The values of $A_{k,m}$(i) and $B_{k,m,}$(i) are respectively determined by the digital processor 164 using the min-max adaptation algorithm and null steering adaptation algorithm. These values are then substituted into Equation 3 to determine the values of the composite complex weights $W_{k,m}$(i) which are passed to the array element modules 140A–140M. Although the algorithms are described herein with reference to the system shown in FIGS. 6C through 10, the algorithms are equally applicable to other systems such as those shown in FIGS. 4, 6A, and 6B as well as others.

Min-max Adaptation Algorithm

The min-max adaptation algorithm is an open loop algorithm meaning that the desired values are calculated based on calibration data but that no measurement of the effects of the values is made. To limit the maximum gain of the sidelobes, the min-max adaptation algorithm first determines the angle of the sidelobe with the largest gain, $\theta_{k\text{-}Max}$. The min-max adaptation algorithm then evaluates the gradient of that sidelobe, $\Gamma_{k,m}(i, \Gamma_{k\text{-}Max})$ and incrementally modifies the value of the complex weight $A_{k,m}$(i) to reduce the gain of the sidelobe with the greatest gain.

The theoretical pattern for the $k^{th}$ beam of an M-element array is given by Equation 4 below.

$$\underline{E}_k(\theta_k, \Phi_k) = \sum_{m-1}^{M} \underline{W}_{k,m}(i) e^{j\left[m\left(\frac{2\pi}{\lambda}\right)\cdot d(\sin\theta_k - \sin\Phi_k)\right]} \qquad \text{Eq. 4}$$

wherein:

- $E_k(\theta_k,\Phi_k)$ is the theoretical pattern for the $k^{th}$ beam;
- d is the distance between elements of the antenna array in meters;
- λ is the wave length of the receive signal in meters.
- $\Phi_k$ is the angle of the azimuth boresight $k^{th}$ main beam; and
- $\theta_k$ is the evaluation angle over which the theoretical pattern is determined.

The angular region of the sidelobes of the $k^{th}$ beam is defined as the total coverage area of the $k^{th}$ beam minus the main beam region between the nulls which constrain the main beam. The angular region of the sidelobes is numerically searched over $\theta_k$ to find the angular location of the sidelobe peak with the largest magnitude $\theta_{k\text{-}Max}$. The gradient at $\theta_{k\text{-}Max}$ is given by Equation 5.

$$\underline{\Gamma}_{k,m}(i, \theta_{k-\mathrm{Max}}, \Phi_k) = |\underline{E}_k(\theta_{k-\mathrm{Max}}, \Phi_k)| e^{j\left[m\cdot\left(\frac{2\pi}{\lambda}\right)\cdot d(\sin\theta_{k-\mathrm{Max}} - \sin\Phi_k)\right]} \quad \text{Eq. 5}$$

wherein:

- $\Gamma_{k,m}(i, \theta_{k\text{-}Max})$ is the gradient at $\theta_{k\text{-}Max}$;
- $\theta_{k\text{-}Max}$ is approximately the angle of the peak of the sidelobe with the greatest gain for the $k^{th}$ beam; and
- $E_k(\theta_{k\text{-}Max}, \Phi_k)$ is the gain of the $k^{th}$ pattern at $\theta_{k\text{-}Max}$, i.e. approximately the peak gain of the sidelobe with the greatest magnitude.

The value of the gradient given by Equation 5 is used to determine the $i^{th}$ iteration of the complex weights, $A_{k,m}(i)$, using a unit vector in the direction of the gradient to define the incremental change according to Equation 6.

$$A_{k,m}(i)=\rho_A \cdot A_{k,m}(i-1)-\upsilon_A \cdot \Gamma_{k,m}(i-1, \theta_{k\text{-}Max}, \Phi_k)/|\Gamma_{k,m}(i-1, \theta_{k\text{-}Max}, \Phi_k)| \quad \text{Eq. 6}$$

wherein:

- $\rho_A$ is the min-max adaptation algorithm decay constant; and
- $\upsilon_A$ is the step size of the min-max adaptation algorithm.

The final term of Equation 6 (i.e. the absolute value of the gradient at $\theta_{k\text{-}Max}$ as given by Equation 5) normalizes the resultant value of the complex weight $A_{k,m}(i)$ as determined by the min-max adaptation algorithm. An un-normalized value of the complex weight may be utilized in an alternate embodiment. The resultant values from Equation 6 can be used in Equation 3 to determine the next iterative value of the composite complex weight $W_{k,m}(i)$ passed to the array element modules.

To achieve or increase a desired performance of the open loop min-max adaptation algorithm, it is important that the spatial (geographical) and temporal (frequency response) transfer function of the array elements to be established either through design, calibration or a combination of both. The three dimensional Cartesian coordinates (x,y,z) of the center of each array element and the alignment of its axis relative to the array as well as the gain of each element versus azimuth and elevation angle measured from the normal should be determined. A complex gain correction for each array element can be determined by calibration using an external reference source according to well-known techniques. The complex gain correction can be incorporated into the weighting terms. The embodiment described above assumes that the complex gain correction has been incorporated into the initial value of the complex weights, if necessary. It should be observed that these corrections are not normally sufficiently accurate to provide suppression of high level interference which requires the use of a concurrent closed loop, null steering adaptation algorithm.

Null Steering Adaptation Algorithm

The null steering adaptation algorithm is used to suppress signals in the sidelobes by combining a weighted set of real or phantom auxiliary beam outputs with the output of the main beam. As shown in FIGS. 6A–6C, rather than using separate auxiliary antennas, in one embodiment, the phantom auxiliary beams are synthesized using the complex weights $D_{k,1}$ and $D_{k,2}$. In general, an arbitrary number of complex weights $\{D_{k,p}, p=1 \ldots P, P<M\}$ coupled to a corresponding number of array elements can be used to form Q independent phantom auxiliary beams, where $Q<[M-P+1]$. Further, in the example illustrated in FIGS. 6A and 6B, the complex weights $D_1$ and $D_2$ are shown for just one beam, k. To expand the notion to encompass a full system, the complex weights $D_1$ and $D_2$ are subscribed for k, $D_{k,1}$ and $D_{k,2}$, to denote their applicability to the specific $k^{th}$ beam as shown in FIG. 6C.

Figure 4:
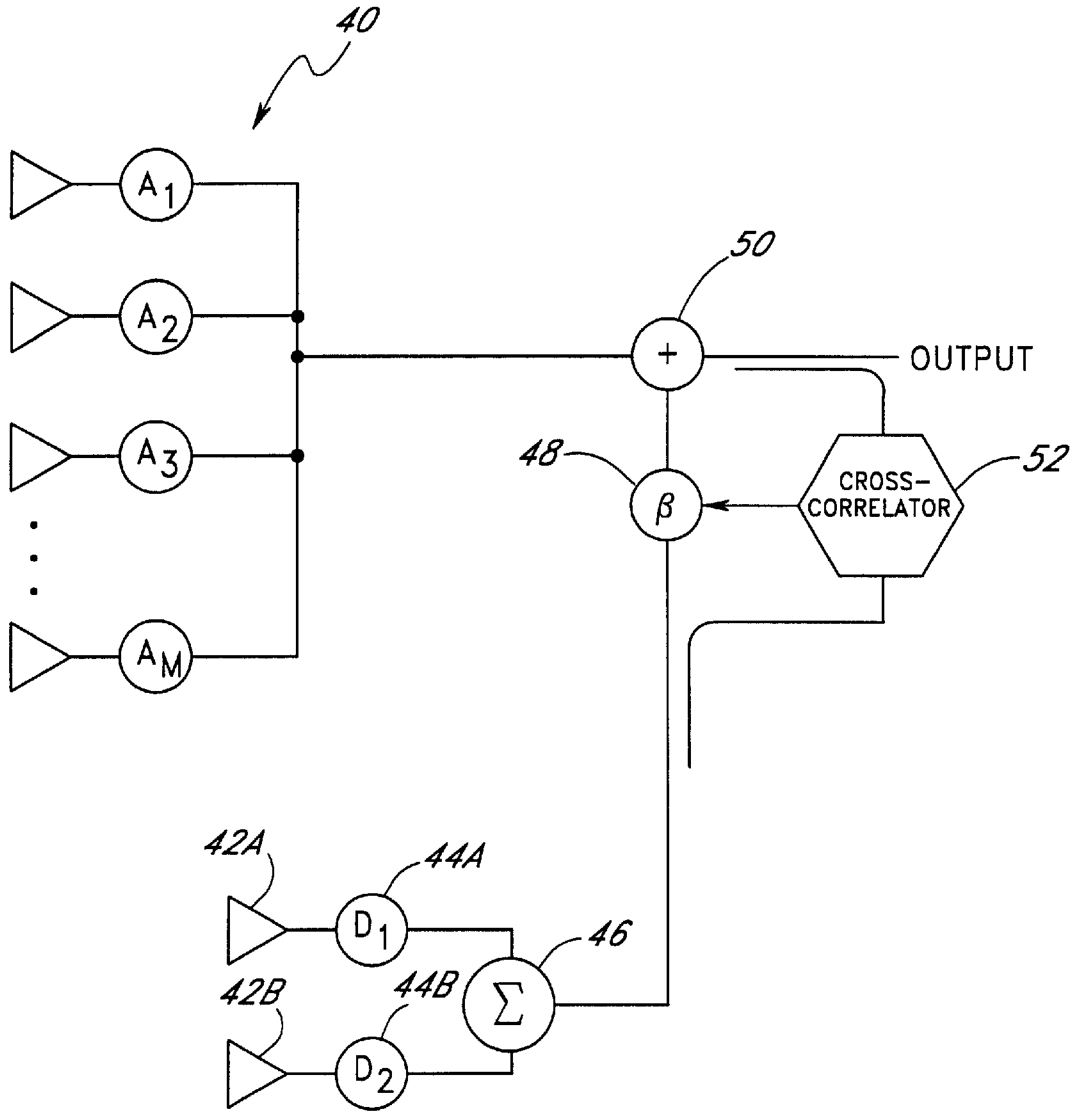
FIG. 4 is a block diagram showing a coherent cancellation antenna system using auxiliary antennas.
Figure 5:
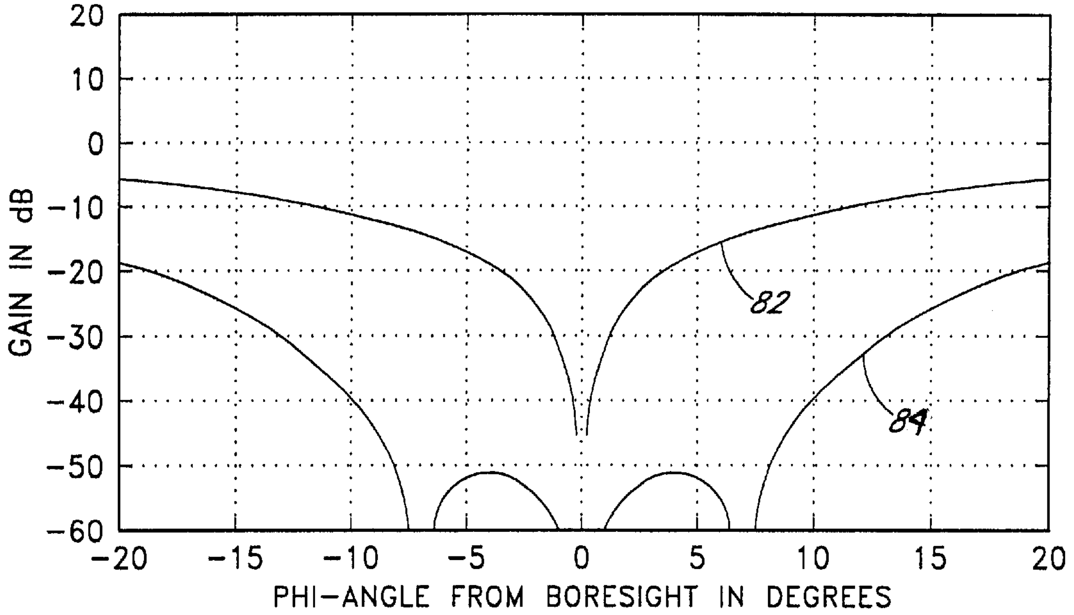
FIG. 5 is a representative diagram showing two auxiliary antenna coverage area patterns.

The simplest such phantom auxiliary beam, in the two element example illustrated shown in FIG. 4, uses two adjacent elements with weighting block with a null in the direction $\Phi_k$. By using additional elements, broader nulls can be formed. For example, the broad null antenna pattern 84 is shown in FIG. 5 which is created by using 4 array elements (P=4) for each phantom auxiliary beam.

The output of the phantom auxiliary beams corresponding to the $k^{th}$ beam is given mathematically in Equation 7.

$$Z_{k,q}(n)=D_{k,1}X_q(n)+ \ldots D_{k,P}X_{P+q-1}(n),\ q=1 \ldots Q<[M-P+1] \quad \text{Eq. 7}$$

wherein:

- $Z_{k,q}(n)$ is the combined output of the $q^{th}$ phantom auxiliary beams for the $k^{th}$ beam;
- $D_{k,p}$ is the complex weight which determines the contribution of the $p^{th}$ array element to the phantom antenna pattern for the $k^{th}$ beam;
- P is the total number of array elements used to create each phantom auxiliary beam; and.
- Q is the total number of phantom auxiliary beams.

From the phantom antenna pattern determined by the complex weights $D_{k,p}$, the null steering adaptation algorithm suppresses signals in the sidelobe of the $k^{th}$ beam by adjusting the value of the complex weight $\beta_{k,q}(i)$ as can be most readily seen with reference to FIGS. 6A and 6B. The adjusted value is then subtracted from the $k^{th}$ beam's output as also can be most readily seen with reference to FIGS. 6A and 6B. Thus, the resultant output for the $k^{th}$ beam is given in Equation 8.

$$\underline{\Sigma}_{k,M}(n) = \sum_{m=1}^{M} \underline{A}_{k,m}(i)\underline{X}_m(n) - \sum_{q=1}^{Q} \underline{Z}_{k,q}(n)\underline{\beta}_{k,q}(i) \quad \text{Eq. 8}$$

The composite output signal, $\Sigma_{k,M}(n)$, is filtered and its complex conjugate is taken to form the complex adaptation error $\epsilon_k(n)$.

The null steering adaptation algorithm determines the complex weights $\beta_{k,q}(i)$ that minimize the total power (i.e., minimize the square magnitude of complex adaptation error signal $\epsilon_k(n)$) using a stochastic gradient method similar to the one used in the min-max adaptation algorithm. The null steering adaptation algorithm uses the gradient, $\Lambda_{k,q}(i)$ that correlates the complex adaptation error signal $\epsilon_k(n)$ with the outputs of phantom auxiliary beams according to Equation 9.

$$\underline{\Lambda}_{k,q}(i) = \sum_{n=L(i-1)+1}^{Li} \underline{Z}_{k,q}(n)\varepsilon_k(n) = \sum_{m=q}^{P+q} \underline{D}_{k,m}\underline{C}_{k,m}(i) \quad \text{Eq. 9}$$

for $q = 1$ to $Q$ wherein:

- $\Lambda_{k,q}(i)$ is the gradient of the complex adaptation error signal $\epsilon_k(n)$ for the $q^{th}$ phantom auxiliary beam;
- $C_{k,m}(i)$ is the cross-correlation measurement samples for the $m^{th}$ array element module $k^{th}$ beam;
- $\epsilon_k(n)$ is the complex adaptation error signal for $k^{th}$ beam; and L is the number of samples used in measurement of cross-correlation.

As noted above, the effect of the phantom antenna elements weights, $D_{k,m}(i)$, is applied here mathematically in order to reduce the effects of signal energy received from the main beam. Within Equation 9, the cross-correlation measurement samples, $C_{k,m}(i)$, can be expressed mathematically according to Equation 10.

$$\underline{C}_{k,m}(i) = \sum_{n=L\cdot(i-1)+1}^{L\cdot i} \underline{X}_m(n)\underline{\varepsilon}_k(n) \qquad \text{Eq. 10}$$

Using the gradient defined by Equation 9, the K-dimensional transfer weight vector as determined by the null steering adaptation algorithm for the $m^{th}$ module is given by Equation 11.

$$\beta_{k,q}(i)=\rho_B\cdot\beta_{k,q}(i-1)+\upsilon_{B\cdot\Lambda k,q}(i-1/|\Lambda_{k,q}(i-1)| \qquad \text{Eq. 11}$$

wherein:

$\rho_B$ is the phantom auxiliary antenna weight iterative equation decay constant, and $\upsilon_B$ is the iteration step size for phantom auxiliary antenna weight correction.

An un-normalized value of the gradient may be utilized in alternate implementations of Equation 11.

As noted above, rather than directly using the adaptive weights $\beta_{k,q}$ on the outputs of the phantom auxiliary beams, it is possible to reduce the amount of computation required by transforming the equations to a new set of adaptive weights $B_{k,q}$ which operate directly on the complex receive samples $X_m(n)$ as shown in FIGS. 6C and 7. This is done for the preferred embodiment where the maximum number of phantom auxiliary beams, Q=[M−P+1], for M elements are utilized. For the $k^{th}$ beam, the summed output of the weighted phantom auxiliary beams is given by Equation 12.

$$\sum_{q=1}^{Q} \underline{\beta}_{k,q}(i)Z_{k,q}(n) = \sum_{q=1}^{Q} \sum_{p=1}^{M-Q+1} \underline{\beta}_{k,q}(i)\underline{D}_{k,p}\underline{X}_{q+p-1}(n) = \sum_{m=1}^{M} \underline{X}_m(n)\underline{B}_{k,m}(i) \qquad \text{Eq. 12}$$

The second expression of Equation 12 given above is expressed in terms of the complex weight $B_{k,m}(i)$ and the complex receive sample $X_m(n)$ by grouping terms associated with each array element module. The value of $B_{k,q}$ is defined by Equation 13.

$$\underline{B}_{k,m}(i) = \sum_{p=1}^{m} \underline{D}_{k,p}\underline{\beta}_{k,m-p+1}(i), \quad \text{for } 1 \le m \le M-Q+1 \qquad \text{Eq. 13}$$

$$= \sum_{p=1}^{m-Q+1} \underline{D}_{k,p}\underline{\beta}_{k,m-p+1}(i), \quad \text{for } M-Q+2 \le m \le Q-1$$

$$= \sum_{p=m-Q+1}^{M-Q+1} \underline{D}_{k,p}\underline{\beta}_{k,m-p+1}(i), \quad \text{for } Q \le m \le M$$

The resultant value of the composite complex weights, $W_m(i)$, to be utilized by the $m^{th}$ array element module are determined by substituting the values of Equation 13 into Equation 3. The composite complex weights $W_{k,m}(i)$ reflect the effects of adapting of both the min-max adaptation algorithm and null steering adaptation algorithm.

Figure 13:
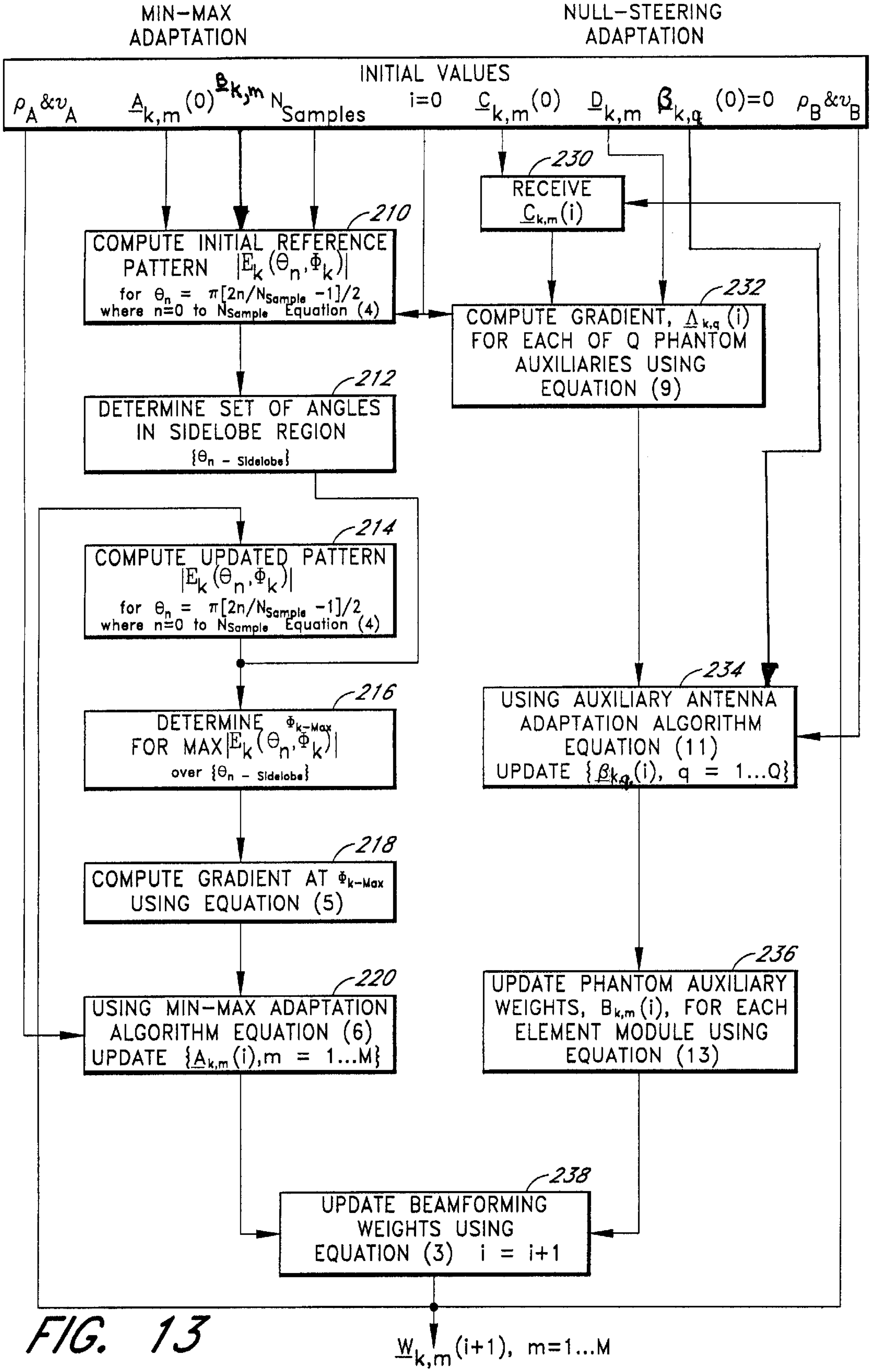
FIG. 13 is a flow chart illustrating operation in accordance with the invention.

FIG. 13 is a flow chart illustrating operation in accordance with one embodiment of the adaptation process. In block 210, the theoretical pattern for the $k^{th}$ beam of the $M^{th}$ element array is determined such as according to Equation 4 using the initial value at iteration i=0 of the complex weights, $A_{k,m}(0)$. The initial value of the complex weights as determined by the null steering adaptation algorithm, $B_{k,m}(0)$, is 0 and, hence, the value of $W_{k,m}(0)=A_{k,m}(0)$. The value of theoretical pattern is determined at $N_{sample}$ different values of the evaluation angle, $\theta_k$.

In block 212, a set of angles is determined over which the sidelobes of the pattern will be evaluated. In one embodiment, block 212 is executed before block 210 and the value of Equation 4 is determined only for those evaluation angles which fall within the sidelobe region, $\theta_{k\text{-}sidelobe}$.

In block 214, the updated theoretical pattern is calculated such as according to Equation 4 according to the current value of composite complex weight, $W_{k,m}(n)$. Note that for i=0, these values have already been determined in block 210 and, hence, this block need not be executed during the first pass through the flow as indicated by the flow arrows on FIG. 13.

In block 216, the maximum gain value of the theoretical pattern's sidelobe and its corresponding angle are selected. In one embodiment, block 216 is implemented as a simple search of the theatrical values determined above. In block 218, the gradient at the selected maximum gain value is determined such as according to Equation 5. In block 220, the K-dimensional transfer weight vector $A_m(i)$ is determined such as according to Equation 6 using the values $\rho_A$ and $\upsilon_A$.

The null steering adaptation algorithm begins in block 230 where the cross-correlation measurement samples, $C_{k,m}(i)$ of the $k^{th}$ beam is received for the current value of i. In block 232, the gradient of the adaptation error, $\Lambda_{k,q}(i)$, is determined, such as according to Equation 9, for each of the phantom auxiliary beams, Q, using the complex weights, $D_{k,m}$ and the cross-correlation measurement samples, $C_{k,m}(i)$. In block 234, the complex weights, $\beta_{k,q}(i)$, are determined such as according to Eq. 11, for each of the Q phantom auxiliary beams using the calculated gradient and the values $\rho_B$ and $\upsilon_B$. In block 236, the update phantom auxiliary weights for each element module are determined based upon the calculated the complex weights, $\beta_{k,q}(i)$ and the complex weights, $D_{k,m}$ such as according to Equation 13.

In block 238, the composite complex weights, $W_{k,m}(i+1)$, are updated according to Equation 3 based upon the determinations of block 220 of the min-max adaptation algorithm and block 236 of the null steering adaptation algorithm. Flow continues back to block 214 of the min-max adaptation algorithm where the updated pattern is calculated based upon the new composite complex weights, $W_{k,m}(i+1)$ and back to blocks 230 and 232 of the null steering adaptation algorithm where a new gradient is determined based upon the next set of cross-correlation measurement samples, $C_{k,m}(i)$ The min-max adaptation algorithm and null steering adaptation algorithm operate concurrently. The functional blocks of the two algorithms may be executed simultaneously, interwoven with one another or a combination of both. The relative values of $\upsilon_B$ and $\upsilon_A$ can be selected to favor one or the other algorithms. For example, by increasing the value $\upsilon_B$ with respect to the value $\upsilon_A$, the resultant pattern reduces the level of sidelobe interference at the expense of increased level of the maximum sidelobe level. Alternatively, the maximum sidelobe level can be decreased at the expense of an increase in the level of interference. In one embodiment, the min-max adaptation algorithm and null steering adaptation algorithm are executed by hardware and software modules represented by the blocks of FIG. 13. In another embodiment, the blocks in FIG. 13 represent groups of microprocessor instructions. In yet another embodiment, the blocks represent portion of an application specific integrated circuited specifically designed to carry out the functional blocks.

Although the invention is described above with reference to a particular operating environment, the teachings of the invention are generally applicable to many environments. For example, the use of multiple beam arrays with adaptive nulling and sidelobe control can be used either to reduce co-channel interference in a CDMA protocol or to minimize the constraints on time or frequency usage required to avoid co-channel interference with TDMA or FDMA protocols.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. A method of adapting an antenna beam to current operating conditions comprising:

determining a maximum gain value of a sidelobe region of an adaptive antenna pattern and a corresponding angle at which said maximum gain value is achieved;

determining a min-max gradient of said adaptive antenna pattern at said corresponding angle;

determining a next value of a first partial weighting value according to a current value of said first weighting value, a first predetermined step size, a first predetermined decay constant and said min-max gradient, wherein said next value of said first partial weighting value tends to limit said maximum gain value within said sidelobe region;

determining a null-steering gradient of an adaptation error based upon a set of cross-correlation measurement samples reflecting said current operating conditions;

determining a next value of a second partial weighting value according to a current value of said second partial weighting value, a second predetermined step size, a second predetermined decay constant and said null-steering gradient, wherein said next value of said second partial weighting value tends to steer a null in the direction of an interfering signal received through said sidelobe region; and updating a beamforming weight based upon said next value of said first partial weighting value and said next value of said second partial weighting value.

2. The method of claim 1, wherein said next value of said first partial weighting value to maintain a relatively uniform gain within said sidelobe region.

3. The method of claim 1, wherein determining said maximum gain value of said adaptive antenna pattern comprises calculating said adaptive antenna pattern open loop.

4. The method of claim 1, wherein calculating said adaptive antenna pattern open loop is executed according to:

$$\underline{E}_k(\theta_k, \Phi_k) = \sum_{m-1}^{M} \underline{W}_{k,m}(i) e^{j\left[m\left(\frac{2\pi}{\lambda}\right)\cdot d(\sin\theta_k - \sin\Phi_k)\right]}$$

wherein:

$E_k(\theta_k, \Phi_k)$ represents a gain value of said adaptive antenna pattern at an evaluation angle, $\theta_k$;

d is the distance between antenna elements of an antenna array producing said antenna beam in meters;

$\lambda$ is the wave length of a receive signal in meters.

$\Phi_k$ is the center angle of a main beam of said adaptive antenna pattern with respect to boresight; and $\theta_k$ is said evaluation angle at which said gain value is evaluated.

5. The method of claim 4, wherein determining said min-max gradient is executed according to:

$$\underline{\Gamma}_m(i-1, \theta_{k-\mathrm{Max}}, \Phi_k) = |\underline{E}_k(\theta_{k-\mathrm{Max}}, \Phi_k)| e^{j\left[m\cdot\left(\frac{2\pi}{\lambda}\right)\cdot d(\sin\theta_{k-\mathrm{Max}} - \sin\Phi_k)\right]}$$

wherein:

$\Gamma_m(I-1, \theta_{k\text{-}Max})$ is said min-max gradient;

$\theta_{k\text{-}Max}$ is approximately said corresponding angle; and $E_k(\theta_{k\text{-}Max}, \Phi_k)$ is said maximum gain value of said adaptive antenna pattern at said corresponding angle, $\theta_{k\text{-}Max}$.

6. The method of claim 5, wherein said determining said next value of said first partial weighting value is executed according to:

$$A_{k,m}(i)=\rho_A \cdot A_{k,m}(i-1)-\upsilon_A \cdot \Gamma_{k,m}(i-1, \theta_{k\text{-}Max}, \Phi_{k)/|\Gamma k,m}(i-1, \theta_{k\text{-}Max},\Phi_k)|$$

wherein:

$A_{k,m}(i)$ is said next value of said first partial weighting factor;

$A_{k,m}(i-1)$ is said current value of said first partial weighting factor;

$\rho_A$ is said first predetermined decay constant; and $\upsilon_A$ is said first predetermined step size.

7. The method of claim 1, wherein determining said null-steering gradient of said adaptation error comprises measuring a level of current energy received through said antenna beam and mathematically applying a transfer characteristic of a phantom auxiliary beam.

8. The method of claim 1, wherein determining said null-steering gradient of said adaptation error is executed according to:

$$\underline{\Lambda}_{k,q}(i) = \sum_{m=q}^{P+q} \underline{D}_{k,m} \underline{C}_{k,m}(i) \text{ for } q = 1 \text{ to } Q$$

wherein:

$\Lambda_{k,q}(i)$ is said null-steering gradient of said adaptation error for a $q^{th}$ phantom auxiliary beam for said antenna beam (k);

$C_{k,m}(i)$ is a cross-correlation measurement sample set of signal energy received each array element, m, of an antenna array cross-correlated with energy in a compensated output of said antenna beam;

$D_{k,p}(i)$ is a complex weight which determines a contribution of a $p^{th}$ array element to said $q^{th}$ phantom auxiliary beam for said antenna beam;

Q is a total number of said phantom auxiliary beams; and.

P is a total number of array elements used to create each of said phantom auxiliary beams, q.

9. An apparatus which produces an antenna beam which adapts to current operating conditions comprising:

means for determining a maximum gain value of a sidelobe region of an adaptive antenna pattern and a corresponding angle at which said maximum gain value is achieved;

means for determining a min-max gradient of said adaptive antenna pattern at said corresponding angle;

means for determining a next value of a first partial weighting value according to a current value of said first weighting value, a first predetermined step size, a first predetermined decay constant and said min-max gradient, wherein said next value of said first partial weighting value tends to limit said maximum gain value within said sidelobe region;

means for determining a null-steering gradient of an adaptation error based upon a set of cross-correlation measurement samples reflecting said current operating conditions;

means for determining a next value of a second partial weighting value according to a current value of said second partial weighting value, a second predetermined step size, a second predetermined decay constant and said null-steering gradient, wherein said next value of said second partial weighting value tends to steer a null in the direction of an interfering signal received through said sidelobe region; and means for updating a beamforming weight based upon said next value of said first partial weighting value and said next value of said second partial weighting value.

10. An adaptive antenna system comprising:

a plurality of array element modules, each of which comprises an antenna element having an output a programmable delay element having an input coupled to said output of said antenna element and configured to produce a delayed output a weighting circuit having an antenna sample input coupled to said delayed output of said programmable delay element and having a composite signal input and a composite signal output, wherein said weighting circuit is coupled to a previous weighting circuit within a previous array element module in a concatenated manner such that said composite signal output from said previous weighting circuit is coupled to said composite signal input of said weighting circuit and wherein said weighting circuit is configured to apply a complex weight to samples received from said antenna sample input to produce weighted antenna samples, add said weighted antenna samples to samples received from said composite signal input and to provide a resultant signal to said composite signal output a second delay element having an input coupled to said output of said antenna element and having a delayed output a cross-correlation measurement circuit having an antenna sample input coupled to said delayed output of said second delay element and having an adaptive error input and a cross-correlation measurement output, wherein said cross-correlation measurement circuit is configured to cross-correlate samples received from said antenna sample input with samples received from said adaptive error input to provide cross-correlation measurement samples to said cross-correlation measurement output; and an adaptation controller having a controller input coupled to said cross-correlation measurement output of said cross-correlation measurement circuit within each of said plurality of array element modules and a weighting output, said adaptation controller configured to determine said complex weight to provide said weighting circuit within each of said plurality of array element modules based upon said cross-correlation samples at said controller input and to provide said complex weight at said weighting output.

11. The adaptive antenna system of claim 10, wherein said cross-correlation measurement circuit further has a delayed adaptive error output configured to provide a delayed version of said samples received from said adaptive error input, wherein said cross-correlation measurement circuit is coupled to a previous cross-correlation measurement circuit within said previous array element module in a concatenated manner such that said delayed adaptive error output from said previous cross-correlation measurement circuit is coupled to said adaptive error input of said cross-correlation measurement circuit.

12. The adaptive antenna system of claim 11, wherein said composite signal output of a last weighting circuit within a last one of said plurality of array element modules is coupled to said adaptive error input of a first cross-correlation measurement circuit within a first one of said plurality of array element modules.

13. The adaptive antenna system of claim 10, wherein each of said plurality of array element modules comprises a plurality of said weighting circuits and a plurality of said cross-correlation measurement circuits, each pair of which corresponds to one of K antenna beams.

14. The adaptive antenna system of claim 10, wherein said adaptation controller is configured to determine said complex weight using a min-max adaptation algorithm which tends to limit a maximum gain value within a sidelobe region said antenna beam and a null steering adaptation algorithm which tends to steer a null in the direction of an interfering signal received through said sidelobe region.

* * * * *

UNITED STATES PATENT AND TRADEMARK OFFICE
CERTIFICATE OF CORRECTION

PATENT NO. : 6,823,174 B1 — Page 1 of 1

DATED : November 23, 2004

INVENTOR(S) : Wesley K. Masenten et al.

It is certified that error appears in the above-identified patent and that said Letters Patent is hereby corrected as shown below:

<u>Column 22,</u>

Line 7, delete "$E_k(\theta_k, \Phi_k)$" and insert -- $\underline{E}_k(\theta_k, \Phi_k)$ --.

Line 25, delete "$\Gamma_m(I\text{-}1, \theta_{k\text{-}Max})$" and insert -- $\underline{\Gamma}_m(i\text{-}1, \theta_{k\text{-}Max})$ --.

Line 27, delete "$E_k(\theta_{k\text{-}Max}, \Phi_k)$" and insert -- $\underline{E}_k(\theta_{k\text{-}Max}, \Phi_k)$ --.

Line 34, delete

"$A_{k,m}(i)=\rho_A \cdot A_{k,m}(i-1)-\upsilon_A \cdot \Gamma_{k,m}(i-1,\theta_{k\text{-}Max},\Phi_k)/|\Gamma_{k,m}(i-1,\theta_{k\text{-}Max}, \Phi_k)|$ --, and insert -- $\underline{A}_{k,m}(i)=\rho_A \cdot \underline{A}_{k,m}(i-1)-\upsilon_A \cdot \underline{\Gamma}_{k,m}(i-1,\theta_{k\text{-}Max},\Phi_k)/|\underline{\Gamma}_{k,m}(i-1,\theta_{k\text{-}Max}, \Phi_k)|$ --.

Line 37, delete "$A_{k,m}(i)$" and insert -- $\underline{A}_{k,m}(i)$ --.

Line 39, delete "$A_{k,m}(i\text{-}1)$" and insert -- $\underline{A}_{k,m}(i\text{-}1)$ --.

Line 58, delete "$\Lambda_{k,q}(i)$" and insert -- $\underline{\Lambda}_{k,q}(i)$ --.

Line 61, delete "$C_{k,m}(i)$" and insert -- $\underline{C}_{k,m}(i)$ --.

Line 65, delete "$D_{k,p}(i)$" and insert -- $\underline{D}_{k,p}(i)$ --.

<u>Column 23,</u>

Line 1, after "and" delete ".".

Signed and Sealed this

Twenty-eighth Day of February, 2006

JON W. DUDAS

*Director of the United States Patent and Trademark Office*